US010926745B2

United States Patent
Beck et al.

(10) Patent No.: US 10,926,745 B2
(45) Date of Patent: Feb. 23, 2021

(54) FORCE AND POSITION CONTROL OF ELECTRICAL BRAKE ACTUATORS

(71) Applicant: Meggitt Aircraft Braking Systems Corporation, Akron, OH (US)

(72) Inventors: Arnold A. Beck, North Canton, OH (US); Scott G. Knight, Wadsworth, OH (US)

(73) Assignee: Meggitt Aircraft Braking Systems Corporation, Akron, OH (US)

( * ) Notice: Subject to any disclaimer, the term of this patent is extended or adjusted under 35 U.S.C. 154(b) by 48 days.

(21) Appl. No.: 16/092,050

(22) PCT Filed: Apr. 7, 2016

(86) PCT No.: PCT/US2016/026381
§ 371 (c)(1),
(2) Date: Oct. 8, 2018

(87) PCT Pub. No.: WO2017/176269
PCT Pub. Date: Oct. 12, 2017

(65) Prior Publication Data
US 2019/0111901 A1 Apr. 18, 2019

(51) Int. Cl.
*B60T 8/17* (2006.01)
*B60T 13/74* (2006.01)
*B64C 25/42* (2006.01)

(52) U.S. Cl.
CPC .......... *B60T 8/1703* (2013.01); *B60T 13/741* (2013.01); *B64C 25/42* (2013.01)

(58) Field of Classification Search
CPC ....... B60T 8/1703; B60T 13/741; B64C 25/42

USPC ......... 303/126, 20, 142; 188/1.11 L, 1.11 W, 188/1.11 E, 71.5, 162, 157, 158; 340/454
See application file for complete search history.

(56) References Cited

U.S. PATENT DOCUMENTS

| 4,995,483 A | * | 2/1991 | Moseley | ................. B60T 8/325 188/162 |
| 6,003,640 A | * | 12/1999 | Ralea | .................... B60T 8/1703 188/1.11 L |
| 7,086,503 B2 | * | 8/2006 | Miller | ..................... B60T 17/22 188/1.11 L |

(Continued)

FOREIGN PATENT DOCUMENTS

| DE | 10302515 | 8/2004 |
| DE | 102010038307 | 1/2012 |

(Continued)

OTHER PUBLICATIONS

Translation of German Patent DE 102010038307 obtained from website: https://worldwide.espacenet.com on Apr. 14, 2020.*

*Primary Examiner* — Pamela Rodriguez
(74) *Attorney, Agent, or Firm* — Renner, Kenner, Greive, Bobak, Taylor & Weber, Co., L.P.A.

(57) ABSTRACT

A system and associated method for achieving both force and position control of motor-driven electrical brake actuators for a brake disc stack that has, and seeks to maintain, a characteristic built-in clearance among the discs. The system employs both force feedback and motor turns position feedback associated with the actuator during a braking operation in order to obtain a motor turns position that achieves the characteristic built-in clearance following braking action or the like.

10 Claims, 23 Drawing Sheets

(56) References Cited

U.S. PATENT DOCUMENTS

| | | | |
|---|---|---|---|
| 8,177,308 B2* | 5/2012 | Ralea | B60T 8/00 188/1.11 L |
| 10,391,985 B2* | 8/2019 | Misumi | F16D 65/18 |
| 2004/0232762 A1* | 11/2004 | Maron | B60T 13/74 303/20 |
| 2005/0082999 A1 | 4/2005 | Ether | |
| 2007/0052289 A1* | 3/2007 | Nilsson | B60T 8/885 303/20 |

FOREIGN PATENT DOCUMENTS

| | | |
|---|---|---|
| EP | 1762746 | 3/2007 |
| WO | WO9850711 | 11/1998 |
| WO | WO03011668 | 2/2003 |
| WO | WO2005100114 | 10/2005 |

* cited by examiner

FORCE AND POSITION CONTROL OF ELECTRICAL BRAKE ACTUATORS

TECHNICAL FIELD

The invention herein resides in the art of vehicle electric brake control systems and, more particularly, to control systems for electric brakes used in association with aircraft. More specifically, the invention relates to a brake control system that is a digital brake-by-wire system with force feedback and position feedback.

BACKGROUND ART

Electric brakes are coming into use in the aircraft industry, substantially eliminating the need for hydraulic systems and replacing those systems with brake-by-wire controls that regulate the application and release of brake force through motor controlled actuators driving a pressure plate into and out of engagement with a brake disc stack.

It is most desirable that a consistent and repeatable built-in clearance be maintained between the pressure plate and the brake disc stack to ensure free-wheeling operation of the wheels when unbraked. In the past, with mechanical/hydraulic brake systems, the brake return mechanisms would typically include a wear compensator that would adjust as the brake disc wore. The adjustment would substantially guarantee a consistent built-in clearance such that the braking activity would be repeatable and consistent throughout the life of the brake disc stack.

The advent of electric brakes has required new attention to the methodologies employed for ensuring repeatability of brake operations since the actual travel of the actuator displacement is a function of motor turns. It is most desirable to obtain an absolute measurement of the motor actuator position with respect to its hard stop location at zero motor turns. That position measurement may be used for position control of the actuator to assure maintenance of an appropriate built-in clearance and for also determining the wear of the brake friction discs. The actual motor turns position is lost at power turn-off and the position always starts at zero at power turn-on.

SUMMARY OF THE INVENTION

In light of the foregoing, it is an aspect of the invention to provide a method and apparatus for electric brake actuators, which combines force feedback and position feedback to control the position of motor-driven brake actuators.

Another aspect of the invention of the invention is the provision of a method and apparatus for electric brake actuators in which both position feedback and force feedback are used to control the motor-driven brake actuators such that when the actuator position exceeds a disc lining contact position of the brake, force feedback is used, and when the actuator position is less than the disc lining contact position, position feedback is used.

Another aspect of the invention is the provision of a method and apparatus for absolute measurement of motor actuator positions in electric brakes that can be used to ensure effective wear monitoring and reliable brake operation.

A further aspect of the invention is the provision of an apparatus and method for position sensing for electric brake actuators employing a means for providing a combination of actuator force feedback and motor turns position feedback for controlling the force that is developed by an electric brake actuator and obtaining the required motor turns position for the desired built-in clearance of the brake.

Still a further aspect of the invention is the provision of an apparatus and method for position sensing for electric brake actuators that employs a means for removing any offset value in a force transducer that is used for measuring the force that is developed by an electric brake actuator.

An additional aspect of the invention is the provision of an apparatus and method for position sensing for electric brake actuators that includes a means for stopping any motor return from extending beyond the designed built-in clearance position of the brake as might occur due to an error in the force sensor used in the force feedback control.

Another aspect of the invention is the provision of an apparatus and method for position sensing for electric brake actuators that corrects the measured motor turns position to the actual measured turns position at a point when power is turned off following an event where the park brake has been locked in place at power off.

Still another aspect of the invention is the provision of an apparatus and method for position sensing for electric brake actuators that periodically finds the motor turns position for brake lining contact and then sends that position to a non-volatile memory that will save that position through any electric power off-on cycle until that procedure is repeated and a new position is determined, such as during a Return to Service (RTS).

Still another aspect of the invention is the provision of an apparatus and method for position sensing for electric brake actuators that includes means for correcting a measured motor turns position to the real motor turns position when the real measured motor turns position is between a brake lining disc contact position and a designed built-in clearance position at electric power turn-off.

Yet another aspect of the invention is the provision of an apparatus and method for position sensing for electric brake actuators that includes a means for correcting a measured motor turns position to the real motor turns position when the real motor turns position is at or above the brake lining contact position at electric power turnoff.

Yet a further aspect of the invention is the provision of an apparatus and method for position sensing for electric brake actuators that provides a means for correcting a measured motor turns position to an actual motor turns position when transitioning from an alternate braking mode to a normal braking mode.

An overriding aspect of the invention is the provision of an apparatus and method for position sensing for electric brake actuators that corrects a motor turns position to keep the built-in clearance of the brake disc stack at a designed value throughout the wear life cycle of the brake discs of the stack.

The foregoing and other aspects of the invention that will become apparent as the detailed description proceeds are achieved by a method for effecting force and position control of motor-driven electrical brake actuators for a brake disc stack having a characteristic built-in clearance, comprising employing a combination of actuator force feedback and actuator motor turns position feedback for controlling the force developed by the electrical brake actuators to obtain a motor turns position that achieves the characteristic built-in clearance.

Other aspects of the invention are achieved by the method for effecting force and position control of motor-driven electrical brake actuators as aforesaid, wherein position feedback controls an initial actuation of the motor-driven electrical brake actuators for up to about 10% of actuator movement, with force feedback controlling after lining contact of the discs of the brake disc stack.

Further aspects of the invention are attained by the method for effecting force and position control of motor-driven electrical brake actuators as aforesaid, further comprising a step of removing any offset value in a force transducer used for measuring the force that is developed by the electrical brake actuators.

Still additional aspects of the invention are achieved by the method for effecting force and position control of motor-driven electrical brake actuators as aforesaid, further comprising a step of preventing said motor-driven electrical brake actuators from returning to a motor turns position more than a set amount beyond said characteristic built-in clearance.

Yet other aspects of the invention are achieved by the method for effecting force and position control of motor-driven electrical brake actuators as aforesaid, further comprising a step of compensating the measured motor turns position of the actuators by a set number of turns correlated with parking brake force when power is turned on when a park brake has been engaged during a period prior to power off.

Still further aspects of the invention are experienced by the method for effecting force and position control of motor-driven electrical brake actuators as above, further comprising a return to service step that periodically determines the actuator motor turns position for disc lining contact and stores that position in a non-volatile memory that maintains that position through a series of electric power off-on cycles.

Another aspect of the invention is achieved by the method for effecting force and position control of motor-driven electrical brake actuators presented above, further comprising a step of modifying a measured actuator motor turns position to an actual actuator motor turns position when said actual actuator motor turns position is between a brake disc lining contact position and a position associated with said characteristic built-in clearance at a time of electric power turn-off.

Additional aspects of the invention are achieved by the method for effecting force and position control of motor-driven electrical brake actuators as aforesaid, further comprising a step of modifying a measured actuator motor turns position to an actual actuator motor turns position when said actual actuator motor turns position is at or above a brake disc lining contact position at electric power turn-off.

Other aspects of the invention are achieved by the method for effecting force and position control of motor-driven electrical brake actuators as recited above, further comprising a step of modifying a measured actuator motor turns position to an actual actuator motor turns position upon a change of braking mode from an alternate braking mode to a normal braking mode.

Further aspects of the invention are achieved by the method for effecting force and position control of motor-driven electrical brake actuators as above, further comprising a step of periodically resetting the actuator motor turns position to maintain the characteristic built-in clearance as the brake discs of the brake disc stack wear.

Yet another aspect of the invention is achieved by the method for effecting force and position control of motor-driven electrical brake actuators as aforesaid, further comprising a step of stopping a motor turns position from returning beyond the design clearance position of the brake.

DESCRIPTION OF DRAWINGS

For a complete understanding of the various aspects, techniques, and structure of the invention, reference should be made to the following detailed description and accompanying drawings wherein.

DETAILED DESCRIPTION OF PREFERRED EMBODIMENTS

Figure 1:
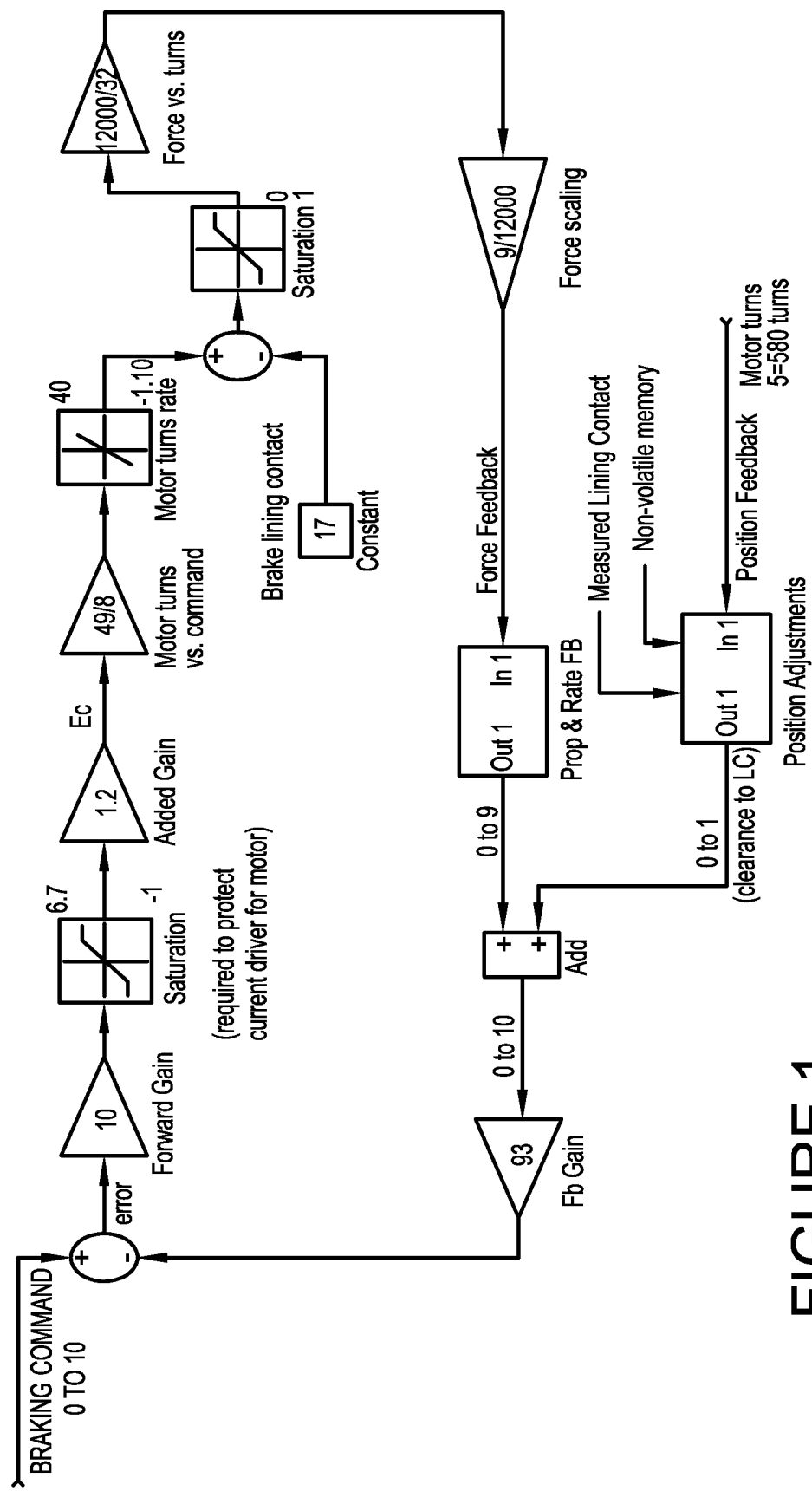
FIG. 1 is a schematic showing of the general feedback control function of the invention.

Braking systems that rely upon the use of friction material to effect the braking operation must typically compensate for wear of the friction material during use. This is to ensure that each application of the brakes has the same amount of dead space or "play" in the brake pedal when the brakes are nearly fully worn as when the brakes were new. This "play" is typically referred to as a "built-in clearance," which is taken up at the beginning of any braking operation before actual braking torque is developed and mechanical energy is converted into thermal energy.

The braking system considered here uses electric motors driving actuators that produce force on the brake discs in proportion to the motor turns or revolutions above the built-in clearance. Both force feedback and motor turns (position) feedback are used to control the braking effort. The instant invention contemplates an apparatus and methodology for position adjustment where a force plate forces the brake discs into contacting engagement with each other and against a back plate, and does so by means of electric motors, each typically having a ram in driving engagement with the force plate. As the respective brake motors turn, an actuator causes a ram to telescopically extend, producing a force on the discs of the brake disc stack. A second part of the invention provides a means for using position feedback when the position is in the clearance region of the brake where there is no force. Force feedback is used for control when the motor position is above the disc lining contact position.

In the past, with hydraulic brakes, mechanical brake return mechanisms of various types could accommodate the return of the brake systems by springs or related mechanisms. The built-in clearance was maintained by a mechanical brake adjustor of any of numerous types. With the advent of electric brakes, however, ensuring that the pressure plate and associated motors are returned to an appropriate home position consistent with the desired built-in clearance of the brake disc stack must be undertaken electromechanically, and not simply by the release of hydraulic pressure and the implementation of return springs.

A problem unique to electric brake systems is how to achieve accurate positioning of the brake motors since the measured turns value returns to zero when the electric power is cycled off-on. A system has been devised that uses nonvolatile memory to keep track of the motor turns position as the brake wears. The instant invention contemplates position sensing for electric brake actuators that depends on an actuator force monitoring system every time that a "Return to Service" is performed, which is typically about every 50 landings. A braking command is undertaken to determine the motor turns position at the point of engagement of the brake discs within the stack. This position is sent to a non-volatile memory.

The brake system of the invention contemplates the applications of pedal and antiskid signals to a first summer to produce a brake-demand signal to a second summer. The brake-demand signal is augmented by a feedback signal, which is the summation of an actuator force signal and a motor position signal. The output of the second summer goes to the brake control system, which drives the motor to achieve the desired force demanded by the pedal signal. Typically, a pedal signal greater than 10 percent correlates with the start of brake force. The antiskid signal is a force reduction signal, such that the input to the second summer is a net brake force signal.

The invention further contemplates a force transducer, such as a load cell or the like, being employed in association with a force plate or endplate, to determine the force applied by the motor actuator to the brake disc stack. During a first "clearance" period, there is no force sense& This is during the period of time that the motor position is taking up the built-in clearance of the brake disc stack. While this level can be any number of motor turns, according to an embodiment of the invention, the clearance accounts for 17.3 motor turns, by way of example. At this point, lining contact is experienced, where the interfaces of the stator and rotor discs engage each other to begin a braking activity. That braking activity correlates with force to a point where a maximum force or "clamping force" is achieved. In the embodiment under consideration, the clamping force is 12,000 pounds and is achieved at approximately 49 motor turns above the clearance value. In other words, the braking activity takes place progressively between 17.3 turns and 49 turns, accounting for about 32 turns in the braking range.

With the basic operation of the system understood, an appreciation can be obtained with regard to the apparatus and methodology for achieving the correct built-in clearance. The invention contemplates using both force feedback and a position feedback system in which the position feedback correlates with a number of motor turns below the disc lining contact position. While it would be desirable to simply use force feedback for complete control of braking, there is no force in the clearance region. Thus, motor turns feedback is used for always returning to a desired home position. Simple counting and monitoring of motor turns cannot be employed because each time power is turned off at the electric brakes, there is a loss of data corresponding to the motor position. When a "Return to Service" (RTS) operation is employed, a correct position is determined and stored in nonvolatile memory for use at each off-on cycle. The invention contemplates that after a "Return to Service" operation, the brake motors are backed off totally to the original "zero" or original "home" position when the brakes were new. Then the brakes are actuated and the motor turns counted until a force is detected indicating that brake lining contact has been experienced. At this point, the active range of operation of the brake has been engaged and the new home position is established by rotating the motors in reverse a fixed number of revolutions correlating with a desired built-in clearance. As presented above, this correlates with 17.3 reverse revolutions in the embodiment under consideration.

As will become apparent from the description that follows, force feedback is added to a constant (1) position feedback after lining contact because of a saturation circuit overriding any continued position feedback after lining contact has been achieved. This ensures that the position feedback is only used in the clearance region.

With reference now to the drawings, an appreciation of force and position control, along with force adjustments, can be attained.

A. Force and Position Control for Electric Brakes

The description herein is with regard to one embodiment of the invention, it being understood that the basic principle of the invention are consistent from one application to another, while specific values and the like may vary.

According to a preferred embodiment of the invention, and for its basic function, a braking command minus a feedback gives an error signal that is operated on by a proportional gain to provide an actuator force that accurately tracks the braking command. A derivative function is included in the feedback signal to improve response and increase stability. FIG. 1 shows the general feedback control function.

The brake control algorithm is activated approximately 0.2 seconds after power on allows for start-up test. A Start-up Delay block ensures that pedal braking cannot begin until 0.49 seconds after the 0.2 second delay. Braking is enabled for 0.65 seconds after power turned on or if pedal is applied greater than 8%.

In this version of the invention, a 90-100% braking command will increase the motor position to 49 motor turns above the clearance position, producing an actuator force of nearly 12,000 pounds. The brake has a maximum clearance which is 17.3 turns below lining disc contact (LC) of the brake discs. Maximum force is obtained at 32 motor turns above LC.

When the motor position is below LC there is no force and thus position feedback must be used in the clearance region. Each motor has a turn sensor that is used to provide a feedback signal. A 10% braking command will move the motor position from the clearance to LC. Increasing the command to 90% will move the motor position to 49 turns above the clearance position.

For the embodiment wider consideration, the number of motor turns required for a specified worn brake is 580. For a new brake, clearance is at zero (0) turns, lining contact is at 17.3 turns, and maximum force is at 49 total turns. As the brake wears, the LC position will increase, and also all the other motor positions. Regardless of the actual position of the motor turns, the control function always operates in the range of 0 to 49 turns. In operation, the motors will turn to a position that will provide the commanded force (force feedback).

When electrical power is turned off, the motor position is locked in place, but the position measured is lost. When the power is turned on, the measured position starts at 0 turns regardless of the real motor position. A Return to Service (RTS) is provided in the control algorithm and is activated periodically. The RTS measures the current LC position, and stores this value in non-volatile memory (NVM). The control algorithm uses this value to reset the measured turns position after each power off-on cycle, and thus keeps track of the real motor position. In use, between RTS requests, the brake wear could cause the LC position to increase by up to 25%, and thus the value stored in NVM will not be correct. The position control includes a function that will correct for the LC value stored in the NVM between each RTS.

Figure 2:
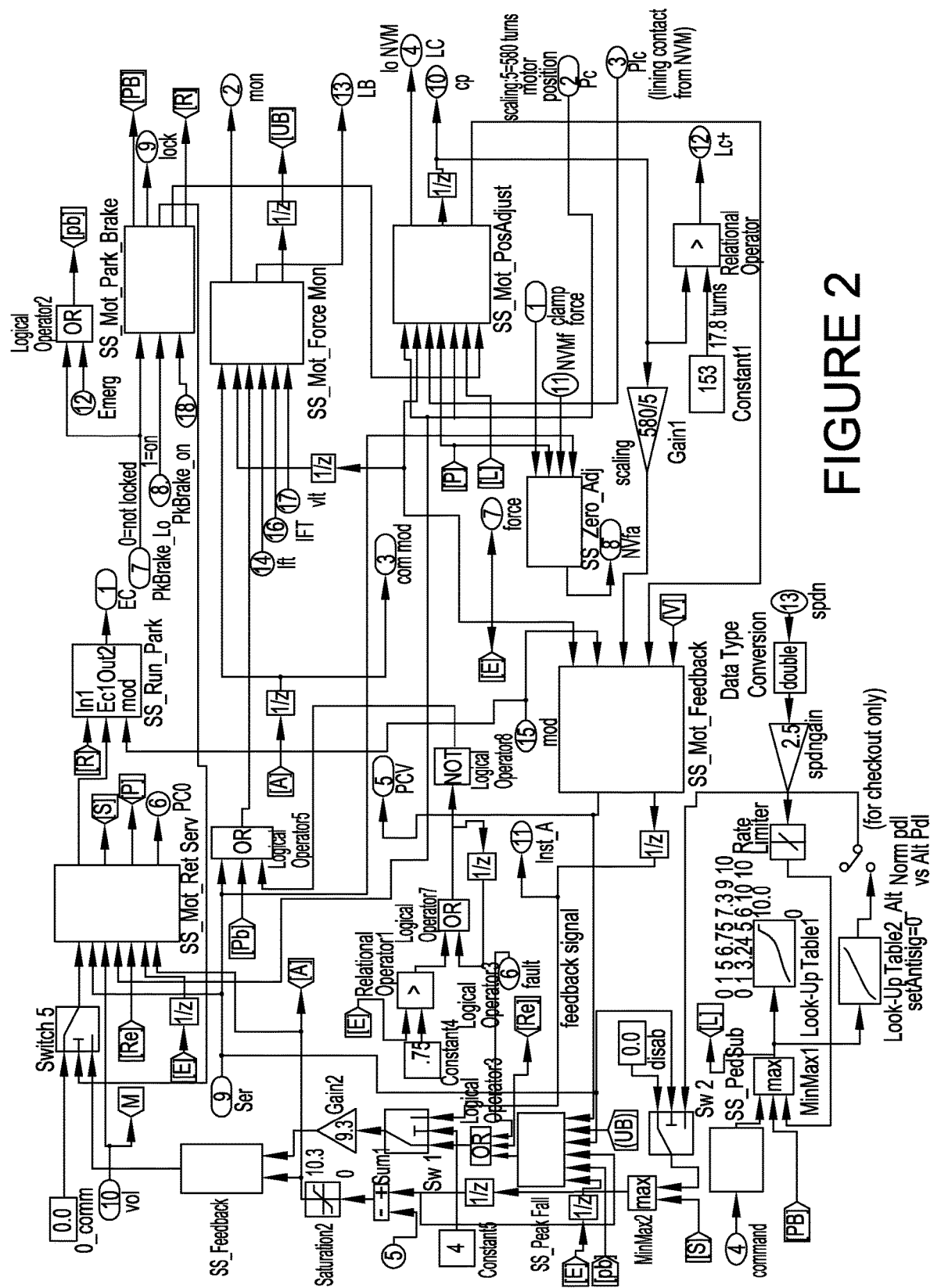
FIG. 2 is a diagram of the top motor control algorithm of the invention.
Figure 3:
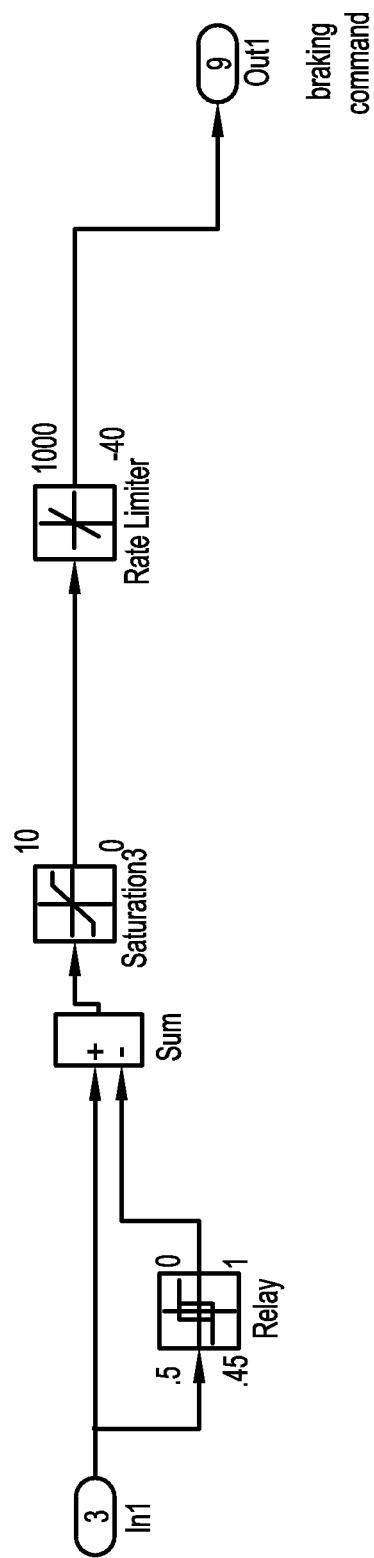
FIG. 3 shows the generation of the normal braking command signal.

FIG. 2 is a diagram of the top motor control algorithm. Input 4 (command) is the normal braking command signal from the brake pedal or autobrake. This signal comes in to the PedSub block, FIG. 3. The function of the PedSub block is to force the pedal signal to zero whenever the pedal displacement drops below 4.5%. The pedal signal will remain at zero until the pedal displacement reaches 5% and then the pedal signal jumps to 5%. Braking force starts at approximately 10% pedal signal. The PedSub block also contains a rate limiter to limit the rate that the pedal signal can be removed to 100% in 0.25 seconds.

PB in FIG. 2 is the park brake input from the Park Brake block (SS_Mot_Park_Brake). The larger of Command, PB, or spin-down is passed on the Look-Up Table3, which is set up to provide 100% braking at 90% pedal input. The characteristic is nonlinear and is set to provide a lower gain at low pedal input. During a Return to Service (RTS), the braking command is removed immediately by Switch2.

Sum1 subtracts the antiskid signal from the braking command (FIG. 2). The difference is passed through Saturation2, which ensures there will be no negative brake commands from pedal minus antiskid, and then to Sum1 on FIG. 4, SS_Feedback, where the force feedback is subtracted from the net command.

Figure 4:
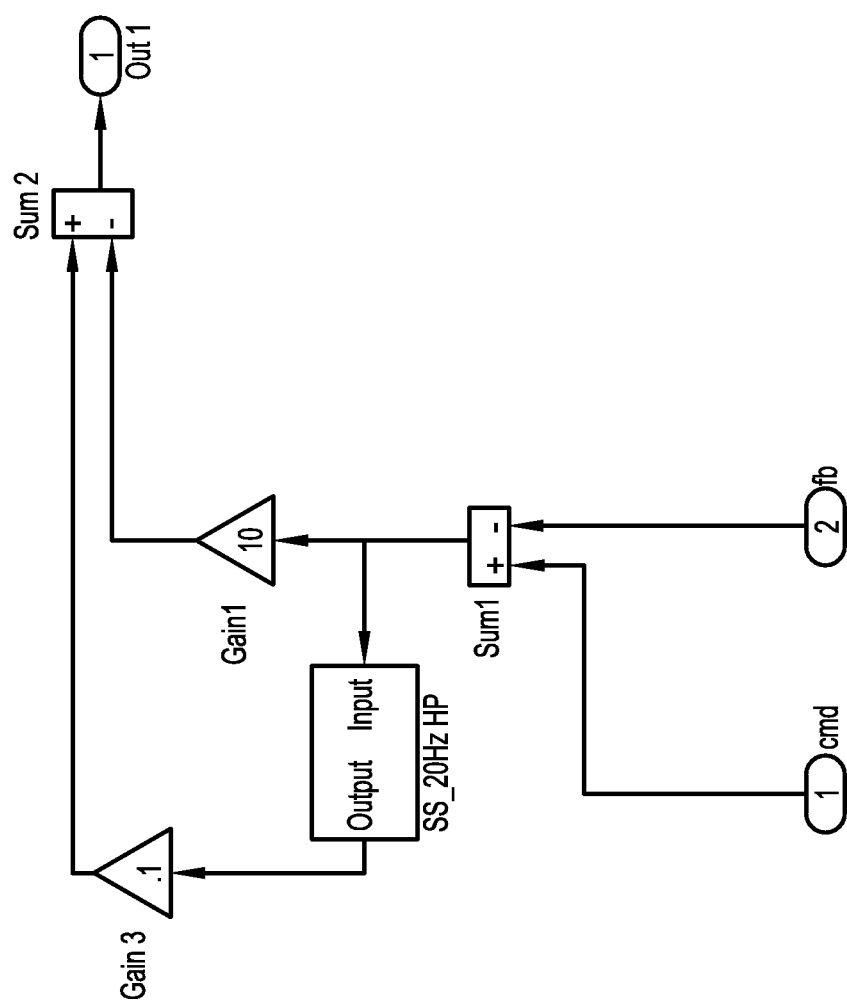
FIG. 4 shows the summation of the brake command signal and feedback signal being multiplied by proportional and derivative gain.

Sum1 on FIG. 4 is the command minus feedback summing junction. This error signal is operated on by the various blocks, shown in FIG. 4. Gain1 is the proportional gain. FIG. 4 also contains a rate network consisting of a Hi Pass filter block and Gain3. The rate and gain signals are added at Sum2. The output of Sum4 goes to Switch 5 on FIG. 2 which removes the command signal during "park brake lock".

Figure 5:
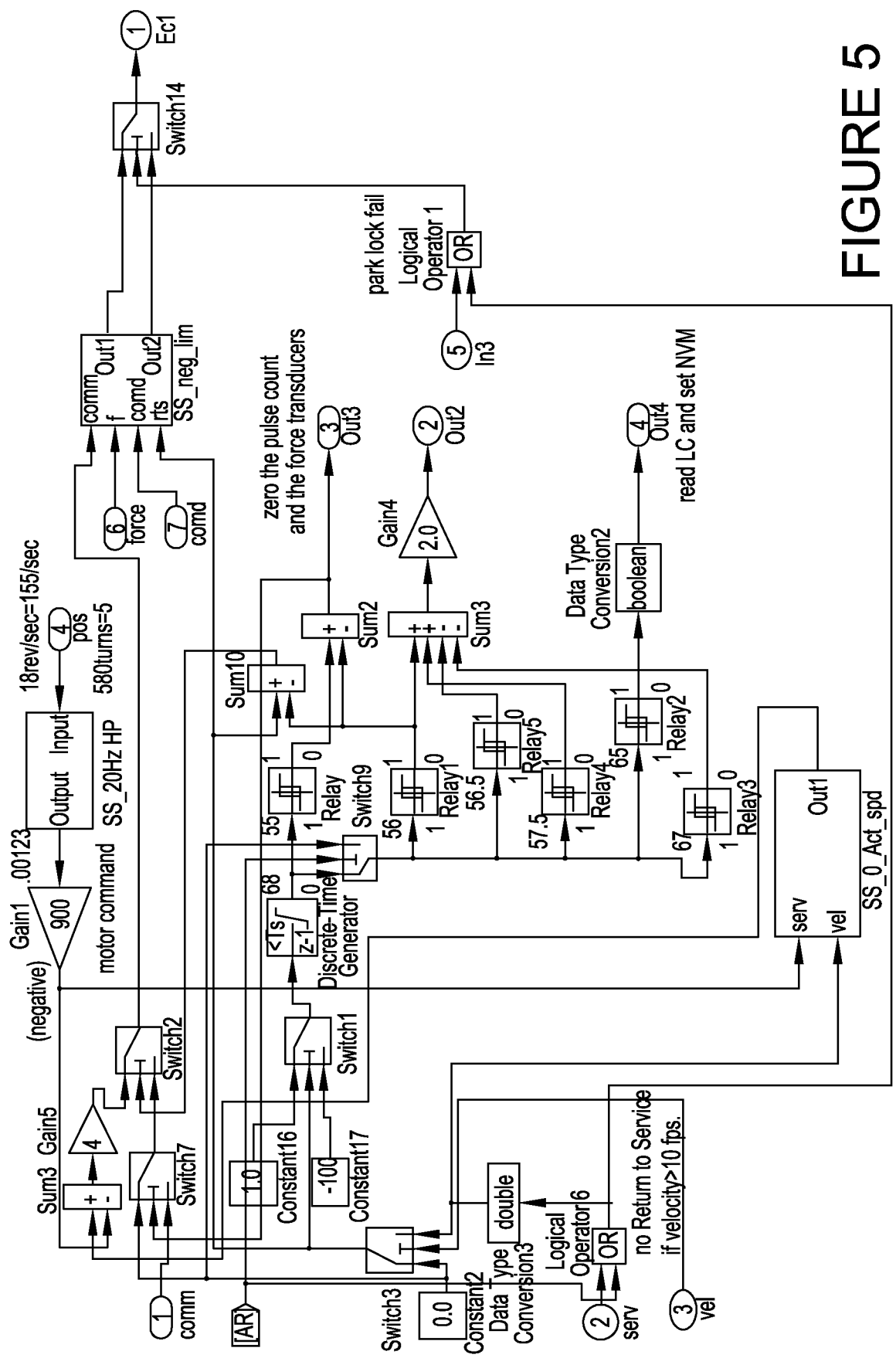
FIG. 5 illustrates the "Return to Service" function of the invention.
Figure 6:
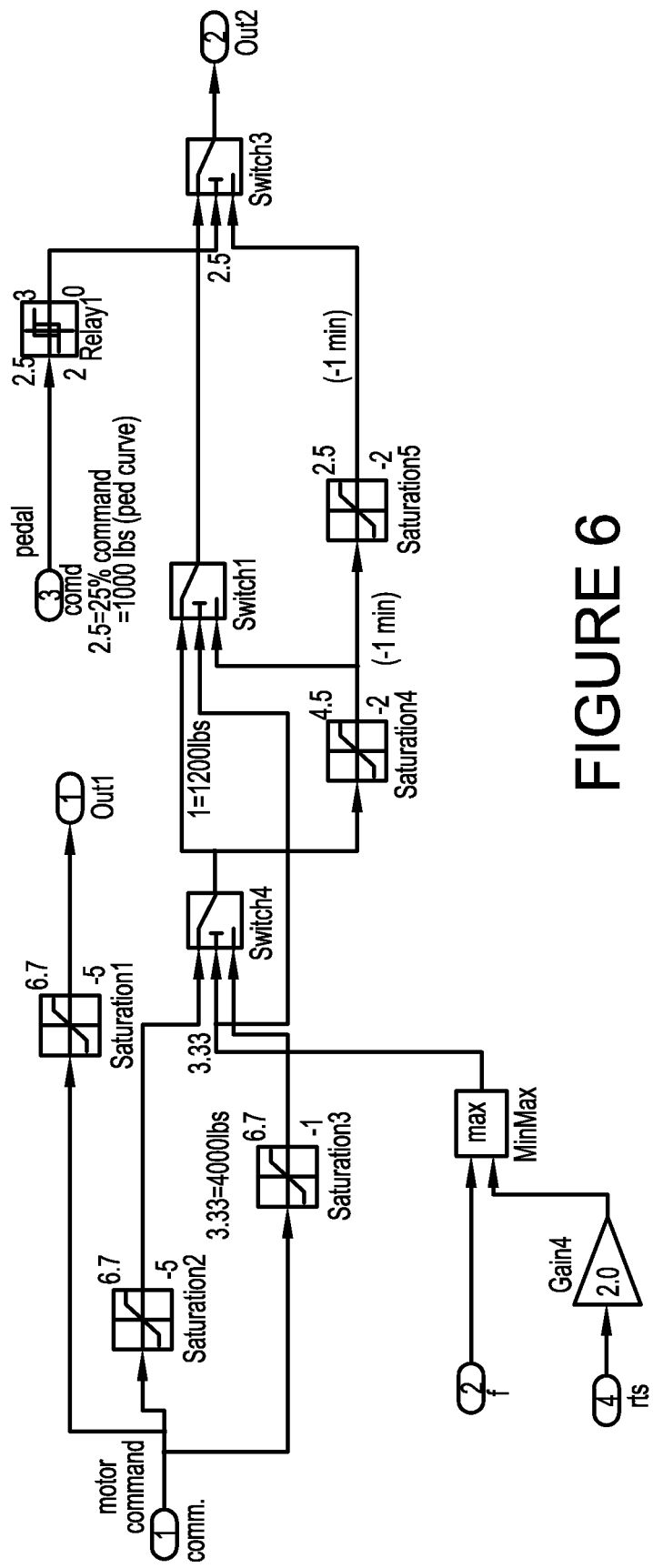
FIG. 6 provides the signal limiting feature associated with the process of the invention.

The output of Switch5 passes through the "Return to Service" block, FIG. 5, which also contains signal limiting features as shown in FIG. 6. In normal operation the motor command signal passes through Switch7 to Switch2, then to Saturation1, Saturation2 and Saturation3, shown in FIG. 6 (Negative Limits). The positive limits are set to 6.7. The negative limit is −1.0 for normal operation if the clamping force is less than 4000 pounds. The negative limit is −5 if the clamping force is greater than 4000 pounds or if the Park Lock Fail is activated.

As shown in FIG. 6, the limited signal passes through Switch4 to Switch1 which decreases the positive limit to 4.5 if the clamping force is less than 1200 pounds. If the braking command signal is greater than 25%, Switch3 selects the output from Switch 1. If the braking command signal is less than 25%, Switch3 selects the output of Saturation5 which limits the positive signal to 2.5. The signal is output at Out2.

Figure 7:
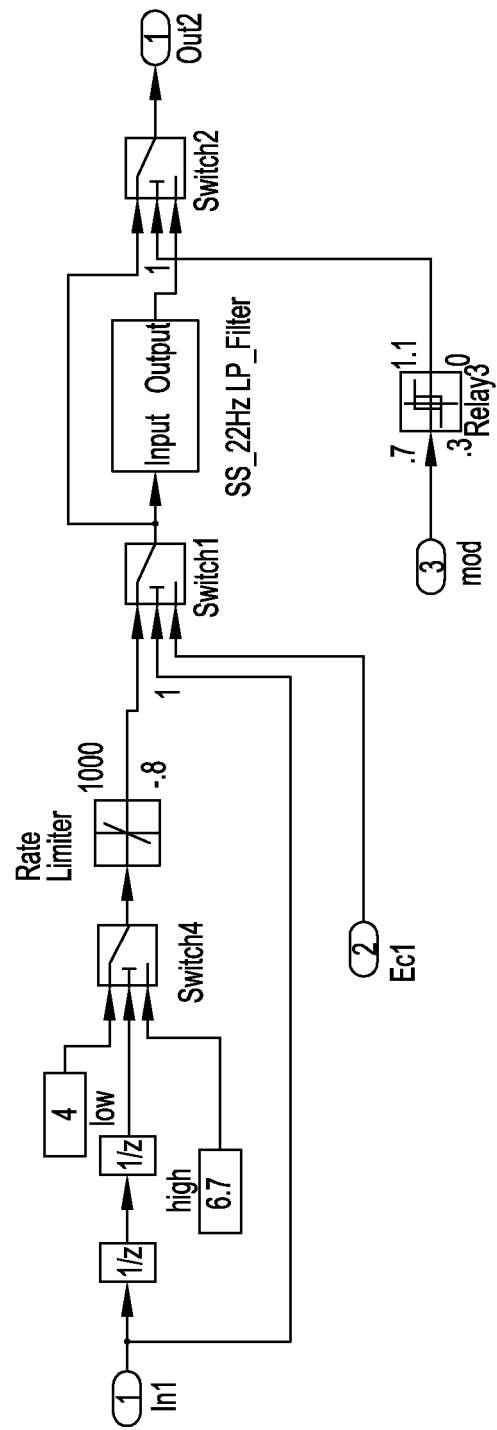
FIG. 7 shows the run/park operative feature of the invention.

In normal operation, Switch 4 (FIG. 5) selects Out2 of the Negative Limit block. Out1 is selected if the Park Lock Fail is activated. This signal, labeled Ec1 goes in In2 on the Run_Park Block (FIG. 7). In1 comes from the Park_Brake block and has a value of zero (0) for normal operation. In1=1 if the conditions are met for "lock brakes". The output of the "Run_Park" (Ec) block goes to a gain of 1.2 and then to motor controllers for the electric brakes. At maximum command, the armature will rotate at about 3000 RPM in the increasing force direction, and about 6500 RPM in the decreasing force direction.

As shown in FIG. 7, the Run_Park block inserts a 22 Hz LP (low pass) filter at the output signal when the average antiskid signal is less than 0.70. The purpose of this filter is to de-couple an antiskid response from a stick/slip action in the motor-actuator which occurs for actuator forces less than 1000 pounds. As the motor armature rotates, a fixed number of pulses are output for each revolution. The pulses are scaled such that 5.0 corresponds to 580 turns. The Pc input (FIG. 2) to the "ic" in, on the SS_Mot_PosAdjust block, is the measured position signal. Regardless of the actual motor/actuator position, each time the power is turned on, Pc and the controlled motor position, cp, start from 0. The position resulting from brake wear is removed from the total position by the SS_Mot_PosAdjust block. Non-volatile memory is used to keep track of the brake lining contact position and is updated at each Return to Service action. When power is removed, the position is locked in place so that there can be no change in position when power is off. See below in "Position Adjustments" for a description of how the non-volatile memories are used.

With force feedback the motor armature will rotate to a position that provides an actuator force signal that closely tracks the braking command signal at Sum1 (FIG. 4). The force signal is scaled for 12,000 pounds to provide the number 10. Look-Up Table3 is set up to provide a signal of 10 for a 90% braking command and the feedback signal is multiplied by 0.93 (Gain2) to ensure that the 12,000 pounds force can be achieved.

Figure 8:
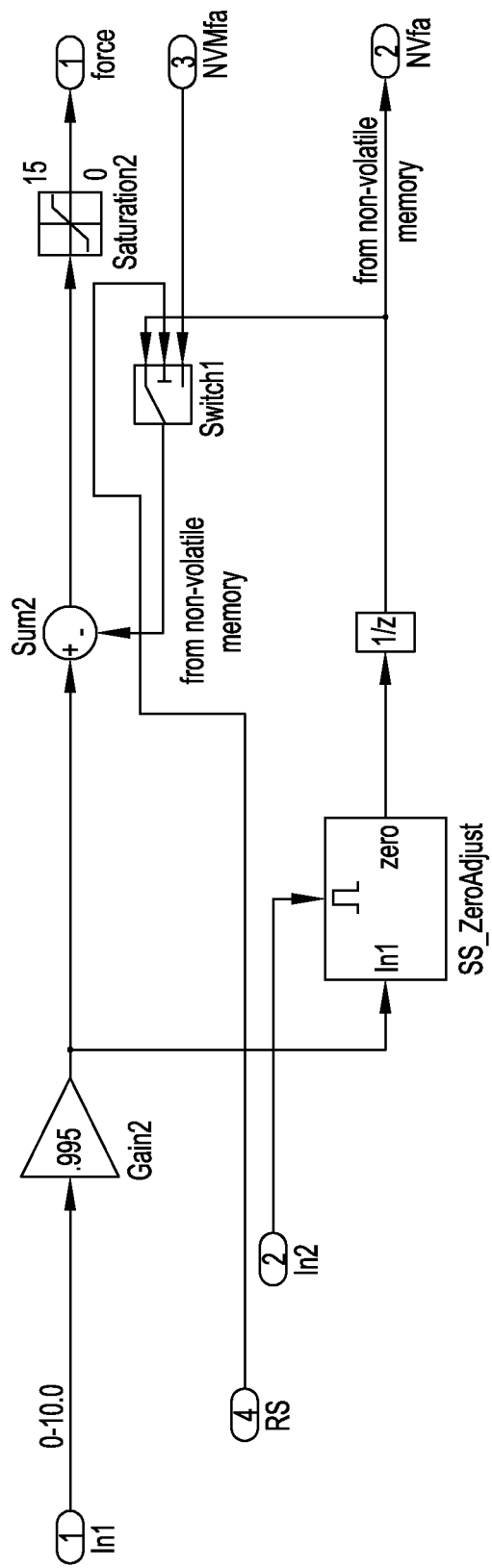
FIG. 8 shows the force transducer zero (0) adjust function of the invention.

The clamping force signal is provided at input 1 on FIG. 2. It goes to the block labeled SS_Zero_Adj which is shown in FIG. 8. It contains a Zero Adjust block. This block is an integrator network that tracks IN1 when IN2=1, and holds the last value of IN1 when IN2 goes to zero. In a preferred embodiment, 55 seconds after start of RTS, the clamping force must be zero. Zero Adjust will read any non-zero value, hold it, and subtract it from the force output signal through Switch1 to correct the zero reading. The output of the Zero Adjust block is sent to a non-volatile memory. At the end of the return to service procedure, the non-volatile memory will return the Zero Adjust value through the lower contact of Switch1, replacing the temporary adjustment through the upper contact of Switch1.

Figure 9:
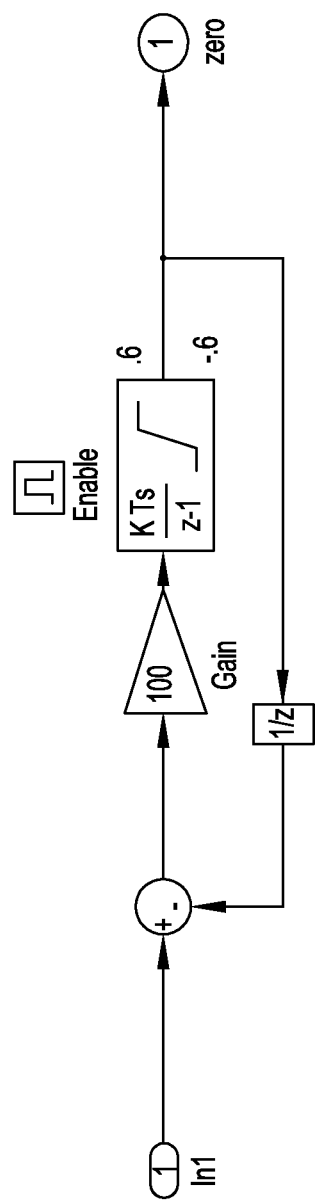
FIG. 9 presents the zero (0) adjust block of the invention.

During that part of the Return to Service action where the force must be zero, the Zero Adjust block (FIG. 9) will track any output from the force transducer, zero it, and send the result to an external non-volatile memory at the output labeled NVf. This is the offset value of the force transducer signal. The non-volatile memory sends this value back at input 3 labeled NVMf. This value is subtracted at Sum2 to provide a 0 output when the position is in the clearance region and the real force must be zero. According to a preferred embodiment, 55 seconds after start of RTS, clamping force must be zero. Zero Adjust will read any non-zero value, hold it, and subtract it from the force output signal through Switch1 to correct the zero reading. The output of the Zero Adjust block is sent to a non-volatile memory. At the end of the RTS procedure, the non-volatile memory will return the Zero Adjust value through the lower contact of Switch1, replacing the temporary adjustment through the upper contact of Switch1.

With continued reference to FIG. 8, it will be appreciated that for the embodiment shown, 56 seconds after start of Return to Service, clamping force must be zero. Zero Adjust will read any non-zero value, hold it, and subtract it from the force output signal through Switch 1 to correct the zero reading. The output of the Zero Adjust block is also sent to a non-volatile memory. At the end of the Return to Service procedure, the non-volatile memory will return the Zero Adjust value through the lower contact of Switch 1, replacing the temporary adjustment through the upper contact of Switch 1.

Figure 10:
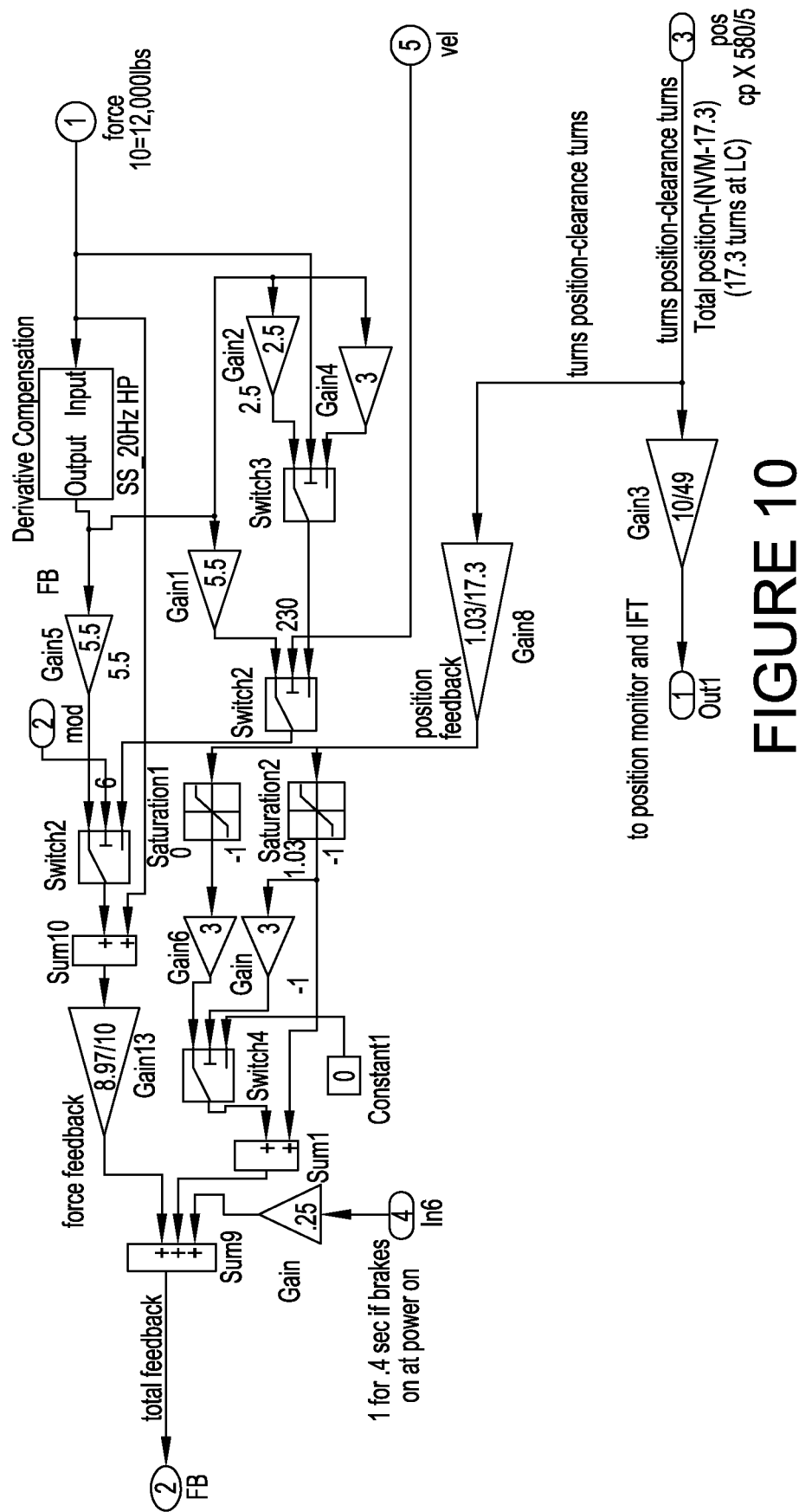
FIG. 10 presents the motor feedback function of the invention.

The Motor Feedback block is shown in FIG. 10. The output force signal of the Zero Adjust block, labelled "force" (FIG. 2), is sent to Sum10 and also to the derivative compensation function shown in FIG. 10. The Derivative Compensation consists of a 20 Hz Hi Pass filter and several gains. Gain1 is used if the average antiskid signal is less than 60% of maximum, and the velocity is greater than 230 feet/second. Gain 2 is used if the average antiskid signal is less than 60% and the velocity is less than 230 feet/second and the force is greater than 10%. Gain4 is used if the average antiskid signal is less than 60%, the velocity is less than 230 fps, and the force is less than 10%. Gain5 is used if the average antiskid signal is greater than 60%. The derivative compensation provides a stabilizing influence and improves the response of this feedback system. The derivative signal is also sent to Sum10 to provide the total force feedback signal.

The output of Sum 10 goes to Gain13. The force signal is 0 until the motor armature position increases above a position corresponding to the lining contact position of the brake discs. Thus position feedback must be used to control position below the lining contact position. The reference value is the clearance position which is set to be 17.3 motor turns below the lining contact position.

The position signal comes in on the "pos" input of FIG. 10. It comes in from Gain1 on FIG. 2 and is scaled to provide the value in turns.

the measured motor armature position, pc, is adjusted by the SS_Mot_PosAdjust block (FIG. 11) to keep the variable cp in the range of 0 to 49 turns, with the clearance at 17.3 turns below LC. The cp signal (FIG. 2) is the final corrected position feedback signal. If the value of cp is positive and if the braking command is 0, the positive signal will cause the motor position to back off until the reference value is matched. Thus 0 command will set the motor position to 17.3 turns below the lining contact position.

As shown in FIG. 10, the "pos" input goes to Gain8 and to Gain3. Gain8 is set at 1.03/17.3 which means that a signal corresponding to 17.3 turns above the clearance position will produce an output of 1.03 to Saturation2. Thus a 10% pedal signal will move the motor armature to the lining contact position. The Saturation2 block limits the positive signal from Gain8 to 1.03 even as the position increases above lining contact. The negative signal is limited to −0.1 in normal operation.

As shown in FIG. 10, the output of Sum10 goes to Gain13, which is set to 8.97/10, which means that 12,000 pounds of clamping force will produce a signal equal to 8.97 to Sum9, where it is added to the position signal of 1.03 from Saturation3 to provide a signal of 10 for 100% braking command.

The "pos" input alone goes to Gain3. This signal is used only for position monitoring. Gain3 provides a signal of 10 for 100% braking command. It requires approximately 32 turns above lining contact for the clamping force to increase to 12,000 pounds when all 4 brake actuators are functioning. The Motor Feedback block also includes a function to stop the return turns motion as soon as the position gets 1.5 turns below the clearance value.

In the embodiment under consideration, in FIG. 10, scaling is such that maximum force will only provide 8.97 at output of Gain13. Position feedback provides the 1.03 when the position is 17.3 turns above clearance to give a total feedback signal at Sum9 of 10 at maximum force. At 17.3 turns below lining contact, the position feedback is zero and thus the motors will hold that position.

If a non-real force exists, it will try to move the motor position below the clearance value. Switch 4 will then add a signal of 5×(−0.1)−0.1=−0.6. This will balance out a feedback force of 720 pounds and stop the return position at 0.09×17.3=1.56 turns below the clearance value. A smaller non-real force would have proportionally less turns below the clearance value. (The 5×−0.1 term is correct since switch 4 selects Gain6 when the position signal gets to −0.09.) Due to wear adjustment, position will go to zero for pc>0, which will keep the clearance at 17.3 turns below LC as the brake wears. There is no position feedback to drive cp<0.

B. Position Adjustments

Position or motor turns adjustments are necessary to ensure the reliable and repeatable operation of the brake system over time. There are many factors to consider for developing the position (motor turns) adjustment algorithm. These are listed and treated below, with reference to FIG. 11. To begin, the factors include:

1. The measured position begins at 0 each time the power is turned on. The real position is locked in place at power off.
2. Power cycled off-on with the position greater than brake disc lining contact (LC) at power off, or with the position between LC and the design clearance position at power off (two different sets of conditions).
3. Make the turns corrections for 2, above.
4. Make the turns corrections only one time at power on. NO change for subsequent pedal applications.
5. Make park brake turns adjustment.

6. Consider the pedal position before all adjustments.
7. Inactivate all corrections during the Return to Service (RTS). The RTS makes an LC (brake lining contact) turns correction with respect to the absolute 0 position.
8. Provide a turns adjustment for brake wear between each RTS.
9. Provide momentary feedback force adjustment, when necessary to move the position back to clearance.
10. Use non-volatile memory (NVM) to set the correct LC position during the RTS.

Figure 11:
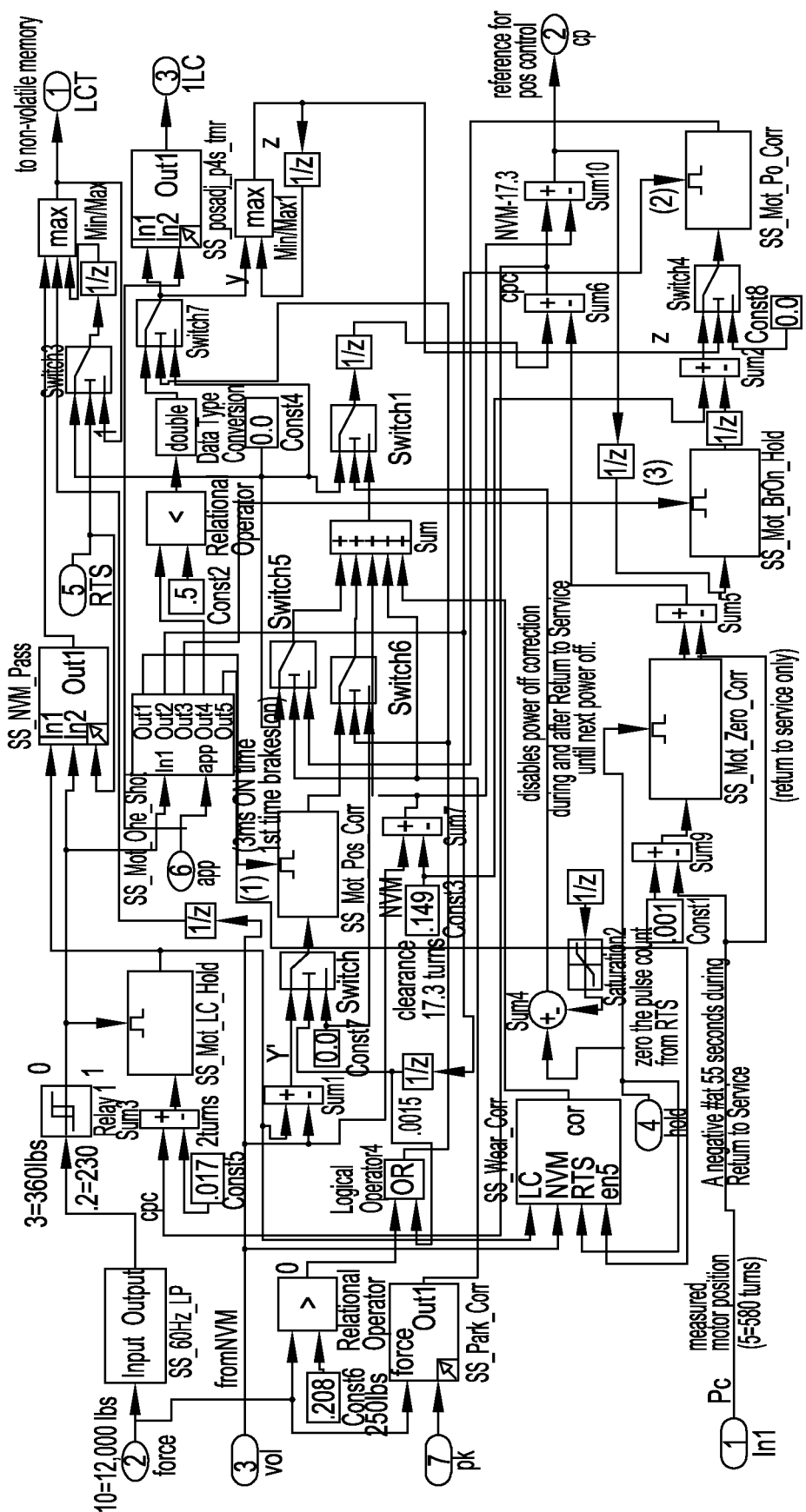
FIG. 11 shows the position adjustment blocks incorporated by the invention.
Figure 12:
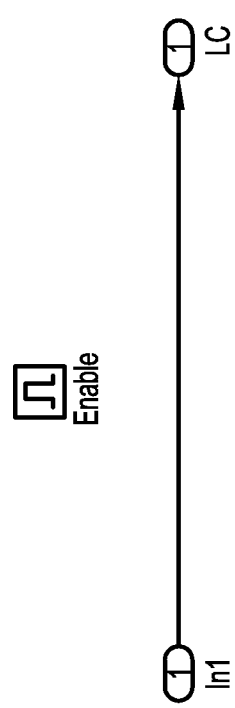
FIG. 12 provides the lining contact hold position of the invention.

Referring to the upper left section of FIG. 11, as brake pedals are applied, the actuator force will increase in proportion to the pedal deflection. The output signal from Relay1 is 1 until the force reaches 360 pounds and then the signal goes to zero. When at 1, the output of the SS_Mot_LC_Hold block (FIG. 12), labeled LC, follows the measured motor position at Sum6 out (cpc always starts at zero at power turn-on) plus the current brake clearance value minus 2 turns to adjust for the switching point being at 360 pounds, which has added 2 turns to the switching value. This also provides the means for obtaining the total motor position each time the power is turned on, which is needed to keep track of brake wear. When the output of Relay 1 goes to zero, the value of LC is held at the brake lining contact position. The LC value is subtracted from the NVM value at Sum1. The output of Sum1 is the NVM minus the LC value, which is a measure of a required position correction since the last RTS. LC also goes to the SS_WearCorr block, FIG. 14.

In the lower right area of FIG. 11 is an output labeled cp, which is the reference turns for position control. The other blocks in FIG. 11 are functions necessary to give a correct value for cp. One of the inputs to Sum10 is a signal labeled cpc (Sum6), which is the motor position from the motor turns sensor (pc). The minus input is from NVM minus 17.3 turns, which is the clearance position.

One input to Sum6 is the measured motor position, labeled pc. The second input is a motor turns correction from the block labeled Sum thru Switch1 which removes the Sum signal during RTS ("Return to Service").

An RTS is done at a predetermined number of aircraft landing cycles. One function of the RTS is to reset the motor turns position for the brake lining contact (LC) that has occurred due to brake wear since the previous RTS. This position is stored in a non-volatile memory (NVM). Between each RTS, the clearance position will increase beyond the design clearance. This will result in a little longer time period to get the brakes on when pedals are applied. Two different brake wear adjustment functions may be provided to keep the clearance at 17.3 turns as the brake discs wear. They are a "step" correction and a "continuous" correction.

The Step Correction function adjusts the clearance on the second brake application, each time the electric power is turned on, if not overridden by the park brake correction function (to be described later). As brakes are applied, the actuator force will increase in proportion to the pedal deflection, as shown in FIG. 11. The output signal from Relay1 is 1, until the force reaches 360 pounds and then the signal goes to 0. When at 1, the output of the SS_Mot_LC_Hold block, FIG. 12, labeled LC, follows the output of Sum3 which is measured motor position (always starts at 0 at power turn-on) plus the desired brake clearance value, minus 2 turns to adjust for the switching point being at 360 pounds which has added 2 turns to the switching value.

When the output of Relay1 goes to 0, the value of LC is held at the brake lining contact position. The LC value is subtracted from the NVM value at Sum1. The output of the Sum1 is now the NVM value minus the LC value, which is a measure of the brake wear since the last RTS. This value is a negative number or 0 when the LC value is the same as the NVM value (immediately after an RTS).

With continued reference to FIG. 11, it will be seen that five track/hold blocks are shown. Each will track IN1 when the top input (enable) is 1, and hold the last value of IN1 when the top input goes to zero. Enable(1) (one_shot Out1)= zero until first time force >360 pounds after power turned on, then goes to 1 for 3 milliseconds (ms), if pedal >7.5%, then back to zero. It can never go back to 1 until power is recycled.

Enable(3) (one_shot Out3)=1 if force >360 pounds at power on. It equals zero when force goes <230 pounds. It cannot go back to 1 unless power off-on or braking mode cycled (normal/alternate). Enable(3) equals zero if force <360 pounds at power turned on, goes to 1 when force goes >360 pounds, back to zero when force goes <230 pounds, and cannot go back to 1 until power off-on.

Enable(2) (one_shot Out2)=0 if force >360 pounds when power turned on. It goes to 1 when force goes <230 pounds, if greater than 360 pounds at power on.

Enable(2) equals zero for 9 milliseconds (ms) if force <360 pounds at power on, then goes to 1 after 9 ms.

It should further be noted that Out4=1 (one_shot Out4) at power on (or braking from alt to norm after power on), if brakes on or off at power on. Out4=zero after 9 ms after power on if force >360 pounds. Out4=1 if brakes not ever on since power on. Remains at 1 until power off-on.

Z=1 if brakes on at power on and force >250 pounds. Z stays at 1 until power off. Z=0 (stays at 0) if brakes off at power turn-on.

Figure 13:
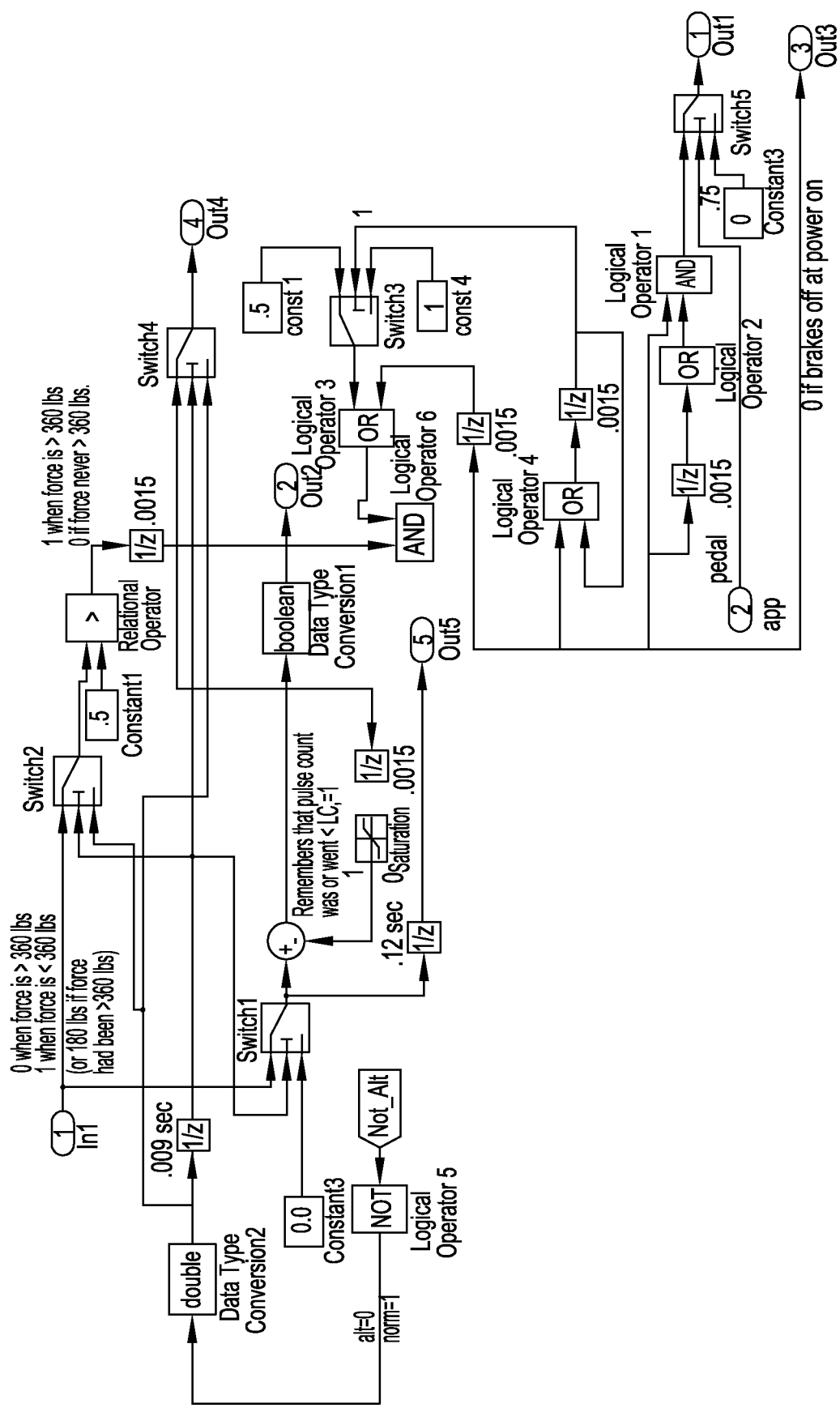
FIG. 13 shows the one-shot block employed in association with the invention.
Figure 15:
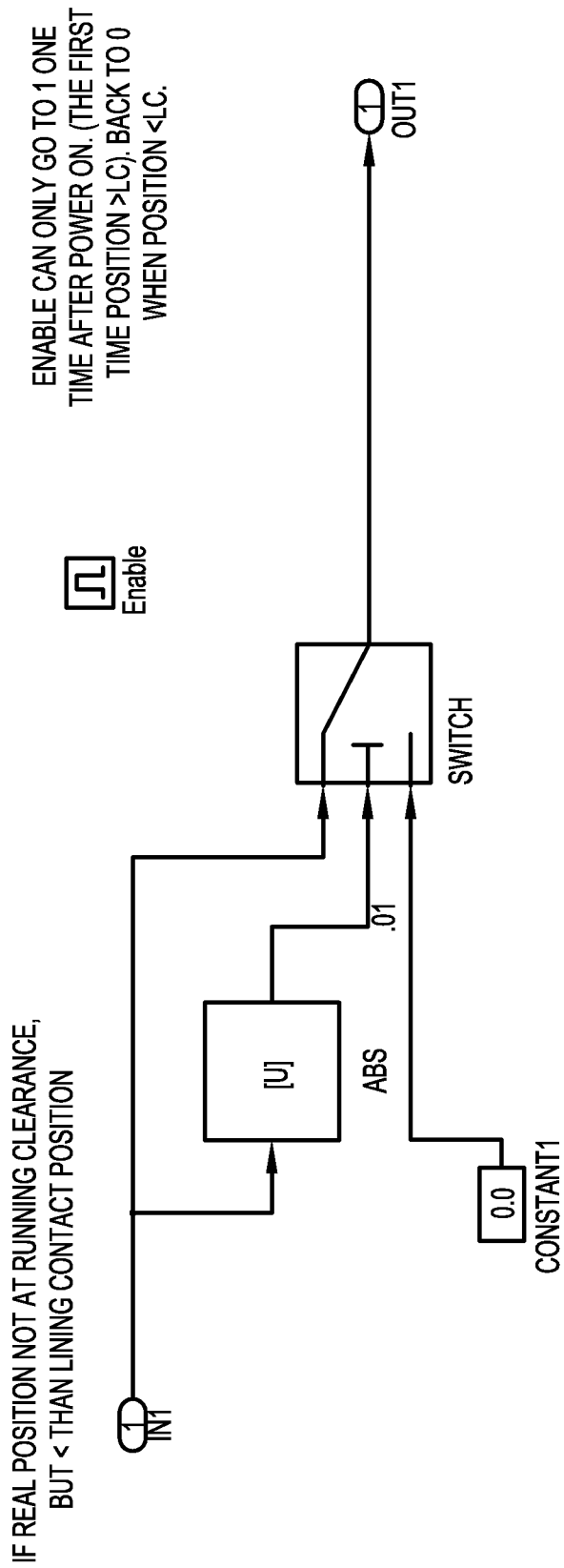
FIG. 15 shows a part of the process for motor position correction when the motor position is between the disc lining contact position and the design clearance position when power is turned off.

The SS_Mot_One_Shot block is shown in FIG. 13. The five outputs (enable signals) are activated at power turn-on if in the normal braking mode at power turn-on. The "double" block (changes binary to decimal number) shown at the left side of FIG. 13 comes from the "normal-alternate" braking selection. The input is "1" in the normal mode. Out2 has a value of 1 if the brakes are off at power turned on, which connects the input of the SS_Mot_Pos_Cor block (FIG. 15) to the output of Sum1, through the Switch block. Out1 tracks the In1 value when the enable signal is 1, and holds that value when the enable signal goes to 0. The enable is 1 for 3 milliseconds the first time the brake discs are in contact after the power has been turned on, if the pedal displacement is greater than 7.5% (shown at Switch5 on FIG. 13). The SS_Mot_One Shot block, ensures that this process (correction from SS_MOT_LC Hold block) can only happen one time (after 9 milliseconds) after power is turned on. The SS_Mot_Pos Corr block contains a dead band on the input of 1.2 turns in order to keep erroneous inputs from causing corrections. Thus there could be an error in the clearance position of up to 1.2 turns. If the correction is greater than 1.2 turns, the dead band is bypassed so that the full correction is made.

With continued reference to FIG. 13, in the normal braking mode, operation of the one-shot is initiated at power turn on. The "out" signals respond as follows. Out2 equals zero for 9 ms if force <360 pounds at power on. It goes to 1 after 9 ms. It stays at zero if force >360 pounds at power on. Further. Out2 goes to 1 after 9 Ins if force <360 pounds at power on, or when force <230 pounds if >360 pounds at power on.

As to Out3: Out3=1 if force >360 pounds at power on. Out3=0 when force goes <230 pounds. It cannot go back to 1 unless power off-on or braking mode cycled (normal-alternate). Out3=0 if force <360 pounds at power on. It goes to 1 when force >360 pounds and back to 0 when force <230 pounds. It cannot go back to 1 until power off-on.

Out1=0 if force <360 pounds at power on. Out1=1 for 3 ms when force goes >360 pounds, if pedal >7.5%, then back to 0. It cannot go back to 1 until power off-on. Out1=1 for 3 ms if brakes on at power on if pedal >7.5%. Out1=0 when force goes <230 pounds and can never go back to 1 until power is recycled. Out1 and Out3 can only go to 1 one time after power on.

Out4=1, brakes on or off, at power on, or braking mode from alt to norm after power on, until 9 ms after power on. Then Out4=0 if force >360 pounds, or stays at 1 if brakes off at power on, Out4=1 if force never >360 pounds since power on. It cannot go to 0 until power off-on.

The network through Logical Operator3 remembers that the brakes were on until the next power off-on. Out5=0 for 9 ms if force <360 pounds at power turn on. Out5 goes to 1 after 9 ms. Out5=0 at power turn on if force >360 pounds. Out5 goes to 1 when force drops <180 pounds.

Figure 17:
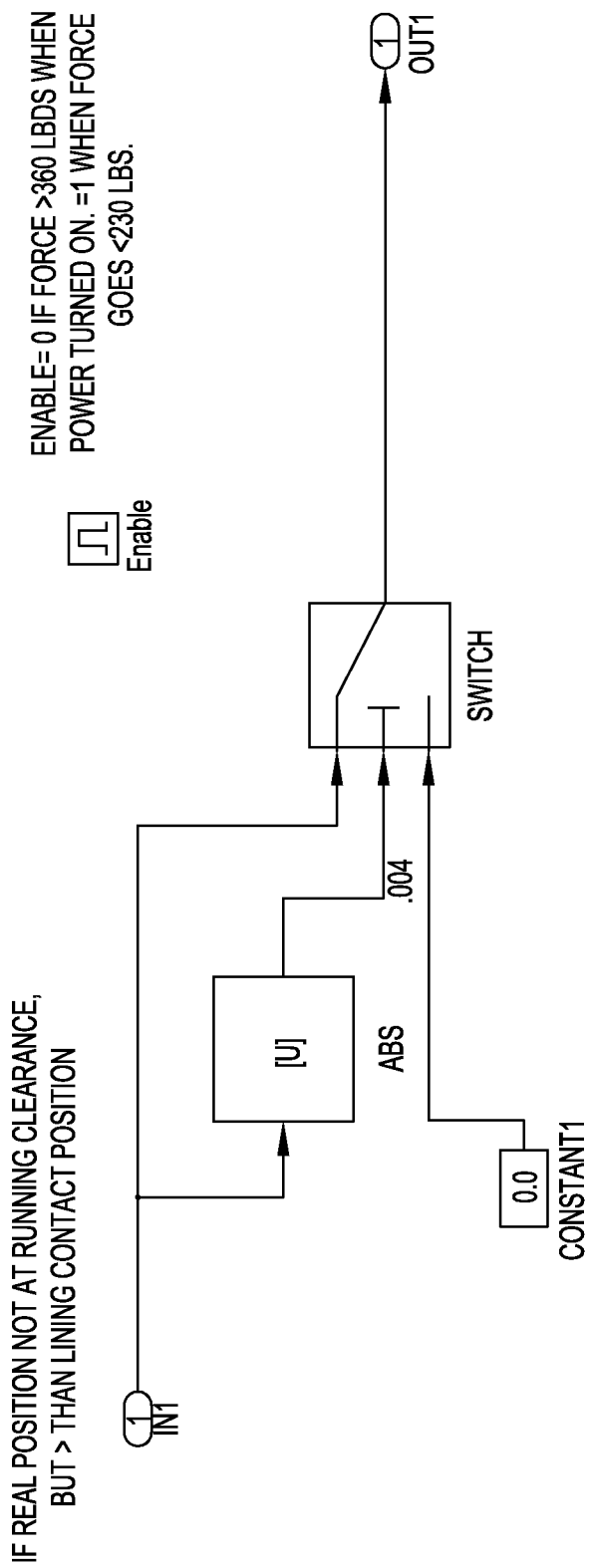
FIG. 17 shows a means for a part of the process for correcting the measured motor position when its real position is above the brake lining contact position at power turn-off.

The Out1 signal from the SS_Mot_PosCorr block goes to Switch6. Switch6 removes the signal, which allows the connection if the force is greater than 230 pounds or if the brakes are off at power on. The output of Switch6 goes to the Sum block, where it is summed with a 'park correction' value (if needed), a signal value of NVM−17.3 turns (the clearance value), and a signal from the SS_WearCorr block (FIG. 14) and a correction from the SS_Mot_PosCorr block (FIG. 17). Switch 1 sets the correction to 0 during the RTS until after the power has been cycled off-on.

Figure 14:
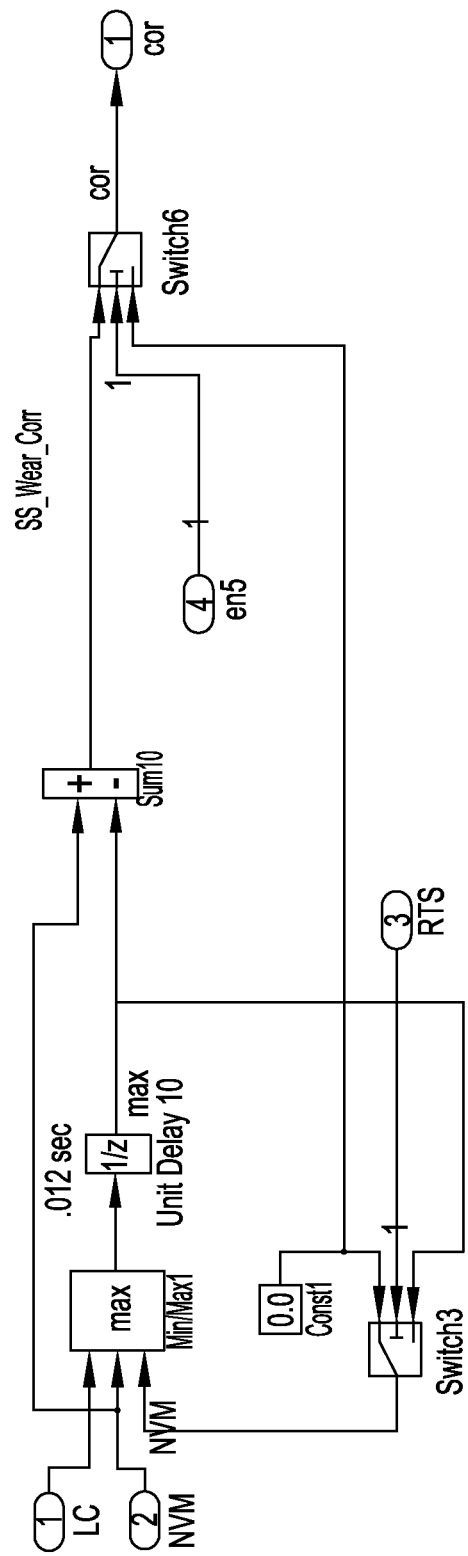
FIG. 14 shows the continuous wear correction function.

The continuous wear correction function is shown on FIG. 14 (SS_WearCorr). Sum10 subtracts the larger of the disc lining contract position (LC) or the NVM, from the NVM. The larger value of NVM or LC is held until the next power off or until an RTS is done. The output of Sum10 is a measure of the brake wear since the last RTS. The wear correction can be made when Input4 (en5) has a value of 1 (from the one-shot, FIG. 13). The correction will be made on each brake application, after the second application, after power has been turned on. In FIG. 14, en5=0 if the brakes are on or off at power on and stays at zero if force is >360 pounds. It goes to 1 after 9 ins if force <360 pounds at power on, or goes to 1 when force is <230 pounds.

The output of Sum (FIG. 11) is the required position corrections. It is added to the measured motor turns, to provide the signal labeled cpc (described previously). The clearance value (NVM−17.3) is subtracted from cpc at Sum10 to provide the signal labeled cp. This is the signal used to provide position feedback in the overall brake control algorithm. Because of the negative value of the wear correction, the value of cp will go to zero (clearance) when the value of pc is still greater than zero by an amount equal to the wear correction (refer to FIG. 10).

As shown in FIG. 11, the value of LCT is stored in the external non-volatile memory during the RTS. The output of Sum is the required position correction. It is added to the measured motor turns, to provide the signal labeled cpc (described previously). The clearance value (NVM−17.3) is subtracted from cpc at Sum10 to provide the signal labeled cp. This is the signal used to provide position feedback in the overall brake control algorithm. Because of the negative value of the wear correction, the value of cp will go to 0 (clearance) when the value of pc is still greater than 0 by an amount equal to the wear correction. This keeps the clearance at 17.3 turns below the lining disc contact of the brake. (See FIG. 10, Motor Feedback.)

Out1 of the SS_RTS_Hold block outputs to the MinMax block which outputs either the larger of LC or the input from non-volatile memory (NVM). This output is labeled LCT. The value of LCT is stored in the non-volatile memory during the RTS.

If power was turned off with the motor/actuator position not at the clearance value but within the clearance zone, then at power on, cpc will be set at NVM—design clearance, which will not be the correct measured position. The first time that brakes are applied, the SS_Mot_LC Hold block (FIG. 12) will hold the position value where brake lining contact was measured, minus a turns value corresponding to the force threshold value on Relay1. Sum1 subtracts this position value from the NVM reading. The difference is remembered, held, by the SS_Mot_Pos_Corr block (FIG. 15) only the first time the brakes are applied after power on. The Sum and Sum6 blocks add this intermediate correction to cpc to give a correct value for motor turns position, cp.

Figure 20:
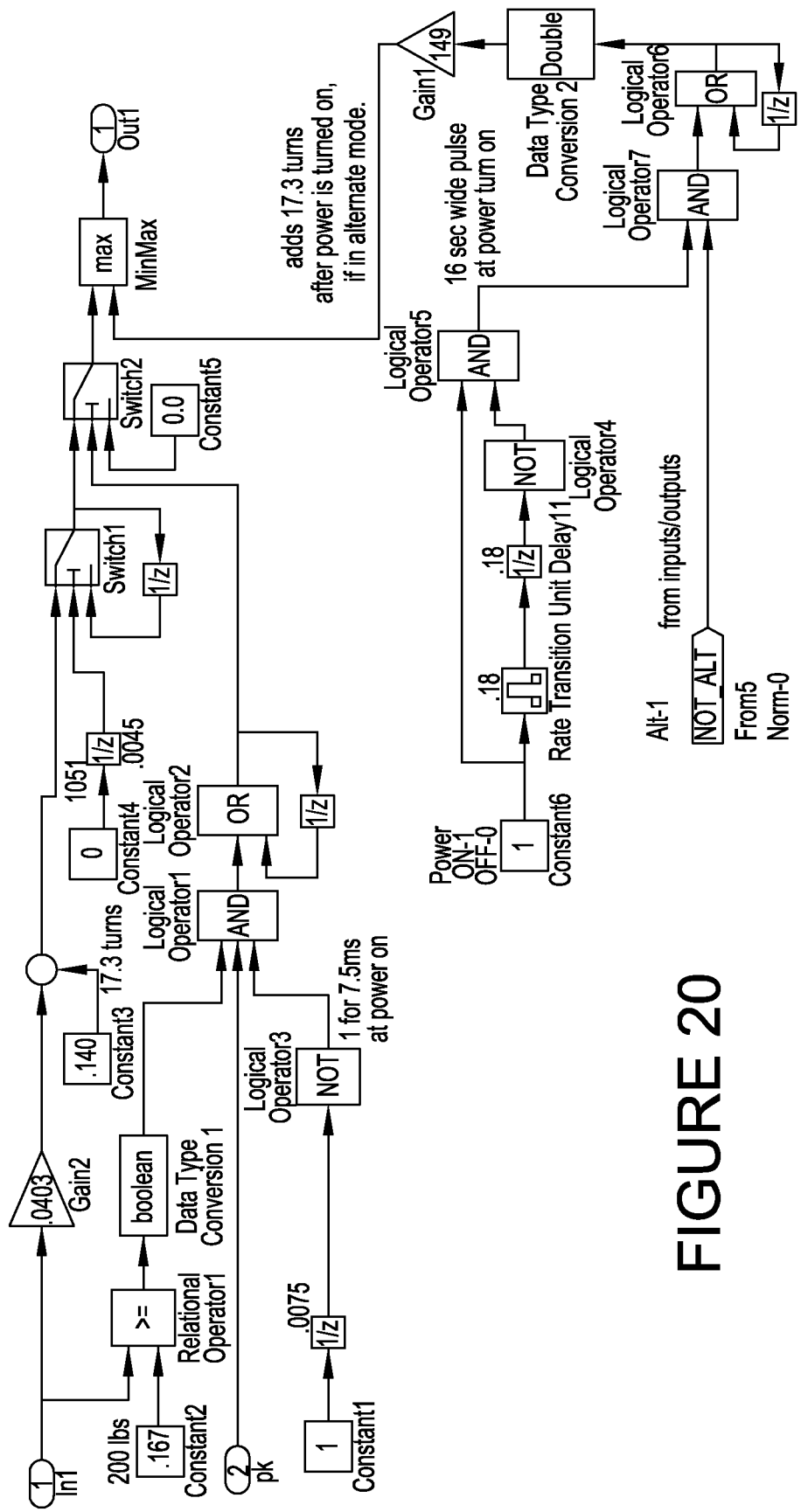
FIG. 20 shows the park correction generation of the invention and also a means for position connection when going from alternate braking to normal braking.

After an aircraft comes to a stop at the gate, typically the park brake will be set and the electrical power turned off. Later, when the power is turned back on, the measured motor position will be 0, but the real position will be a value corresponding to the motor turns required to obtain the park force. See FIG. 20 SS_ParkCorr. The park correction adds a position value at Sum proportional to the turns that are required to obtain the given park force.

The conditions that must exist before this correction is made are: (1) park brake is commanded, and (2) the clamping force must be greater than 200 pounds during the first 7.5 milliseconds after power on. This correction is held until the next power off/on cycle.

Aircraft braking is normally done in the normal braking mode, using force and position feedback. An alternate or manual braking mode is available to allow braking if the normal mode has been disabled. There is no position feedback in the alternate mode. If braking has been applied in the alternate mode and then released, the force feedback can only return the motor position turns to the brake disc lining contact (LC) position, because there is no position feedback. The SS_Mot_One_Shot (FIG. 13) provides the motor turns correction when switching from the alternate to the normal braking mode in a manner similar to the "step" wear correction described above. When power is turned on and the braking mode is switched from alternate to normal, Out1 of the SS_Mot_One_Shot (FIG. 13) will provide enable 1 for 3 milliseconds. The first time brakes were applied, lining contact will occur at a measured turns of approximately 17.3 less than the NVM value. Thus, the output of Sum1 (FIG. 11) will be approximately 17.3 turns (0.149). The 17.3 turns will be held by the SS_Mot_PosCorr block. The 17.3 turns is added at Sum (FIG. 11) to provide the correct clearance position. This allows the position feedback to return the motor position to the clearance position. Another method for this correction is shown at the bottom left of FIG. 20. Upon switching from the alternate mode to the normal mode, 17.3 turns are input at the "max" block. This allows the position feedback to return the turns to the clearance position.

When the alternate to normal braking correction is made, both of the wear corrections are disabled. The continuous wear correction is disabled by Switch2. The step wear correction is disabled by the SS_Mot_One_shot (FIG. 13), which is not activated at power on if in the alternate braking mode, due to an input of the SS_Mot_One_Shot being kept at 0 at power on.

If the brake discs were in contact (pedals were applied) when a power off glitch occurred, at power on the brakes will still be on, but the motor position reading will again be zero and cpc will read NVM−17.3 turns, which is not the correct value. When the motors are enabled (~200 milliseconds after power turned on, for 450 ms, or pedal >8% and 650 milliseconds after pedal <8%), force feedback will try to return the motor actuator position to the lining contact position when the pedal signal drops below 10%.

Figure 18:
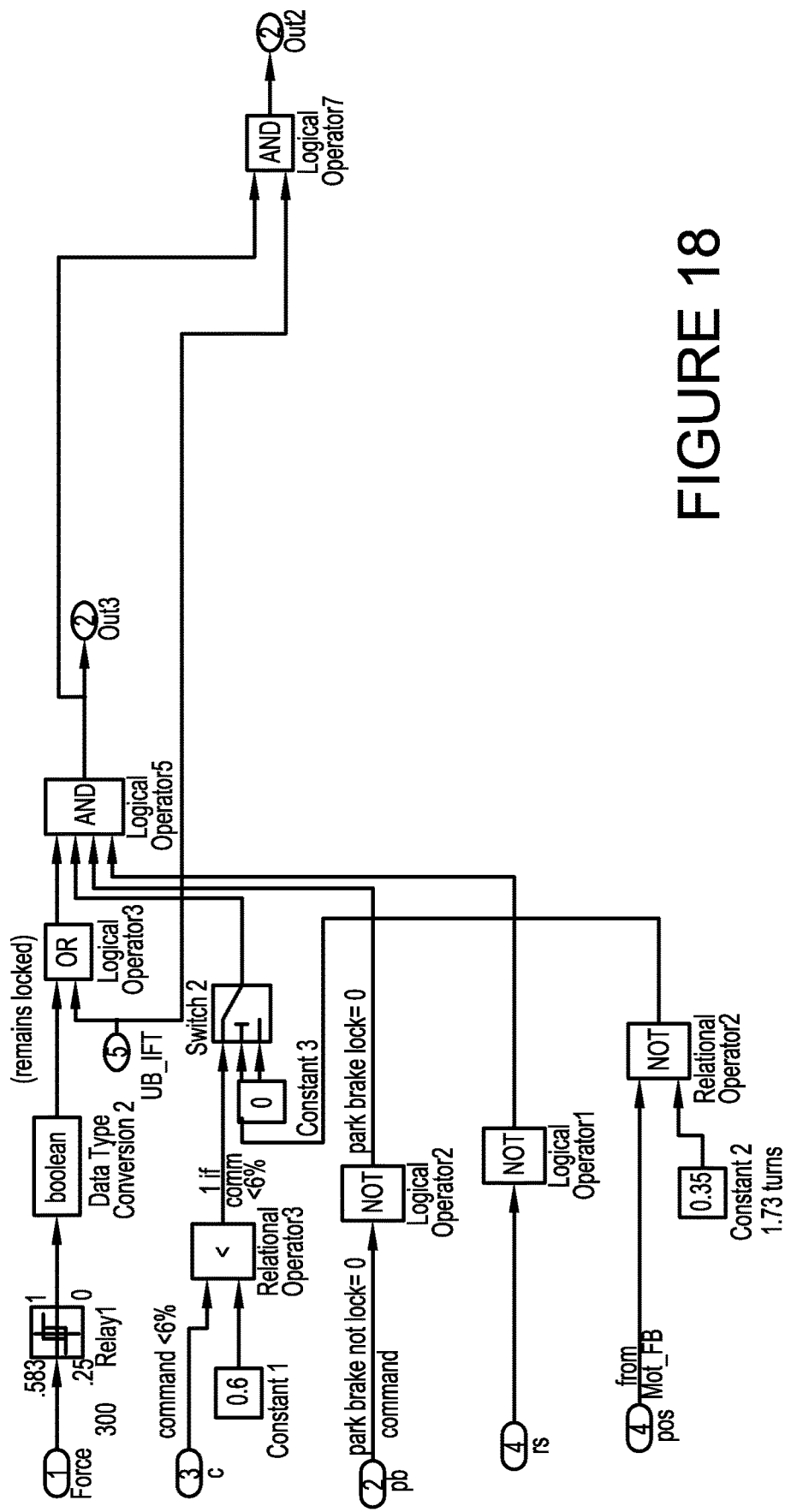
FIG. 18 shows a means for providing a separate feedback force to cause the actuator position to return to the disc lining contact position.
Figure 22:
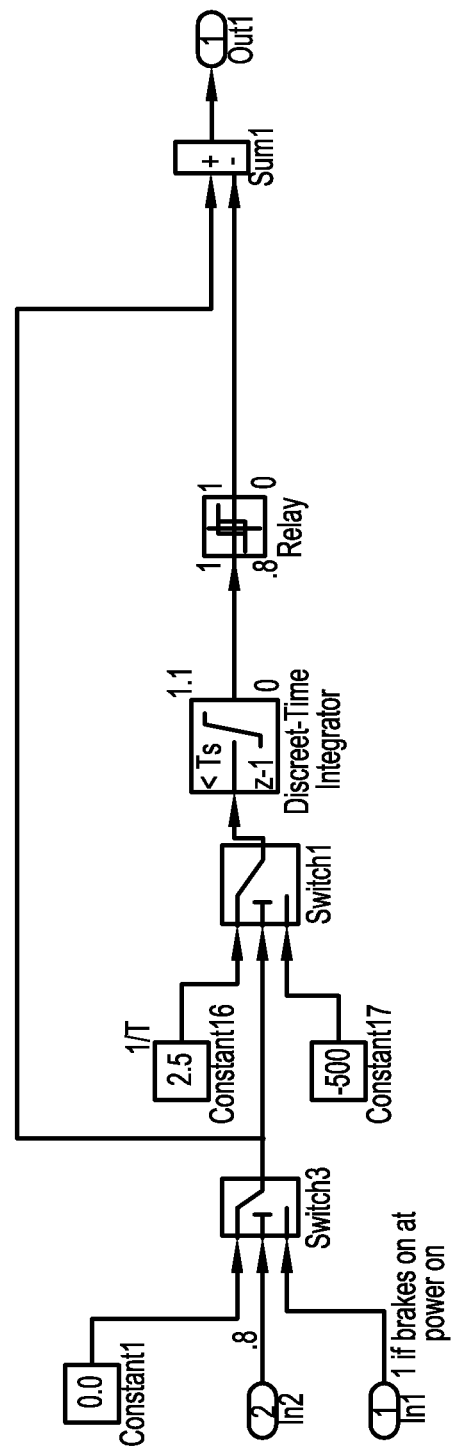
FIG. 22 provides the generation and implementation of a 0.4-second timer.

Force feedback can only return the actuator part way to the lining contact position (depends on level of initial force). Help for return is provided by the SS_PkFail block (FIG. 18), which provides for maximum return signal until the force drops below 300 pounds. Additional help comes from output 1LC of the SS_Motor_PosAd_.4s_tmr block (FIG. 22) working through In6 of the SS_Mot_Feedback (FIG. 10) block. The brake pedal must be less than 8% and a force greater than 250 pounds must exist at power on to initiate this function. If these conditions have been met, a signal equivalent to 300 pounds is applied for 0.40 second to help lower the turns position (FIG. 22).

Figure 16:
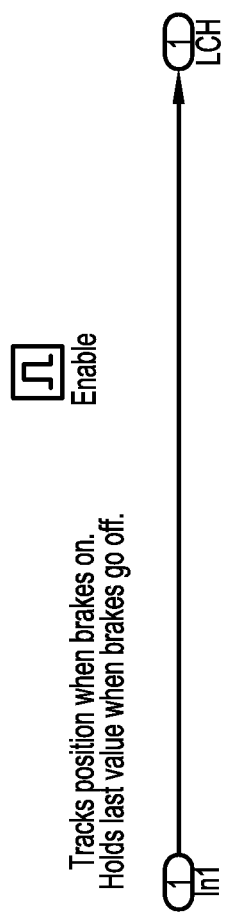
FIG. 16 shows a means for holding that motor position value when the position goes below the disc lining contact position.

The SS_Mot_BrOn_Hold block (FIG. 16) operates just the opposite of the SS_Mot_LC_Hold block (FIG. 12) in that it tracks the value of cp when brakes are on and holds the last value as brakes go off, until the next power cycle. Sum2 (FIG. 11) passes the value 0.149 (17.3 turns)−LCH at brakes off. The SS_Mot_Po_Corr block (FIG. 17) is now in the tracking mode and remains in this mode until next power off. It tracks the output from Sum2 which is equal to 0.149−LCH. This is the value added at Sum to make cp, the corrected real position. (LCH is the output of the SS_Mot_BrOn Hold block.)

Enable 2 goes to 1 when the force is less than 230 pounds. This enables the SS_Mot_Po_Corr block and allows the position correction to go to the Sum block through Switch5. The SS_Mot_One_Shot block, shown in FIG. 13, ensures that this process can only happen one time after power is turned on.

Figure 21:
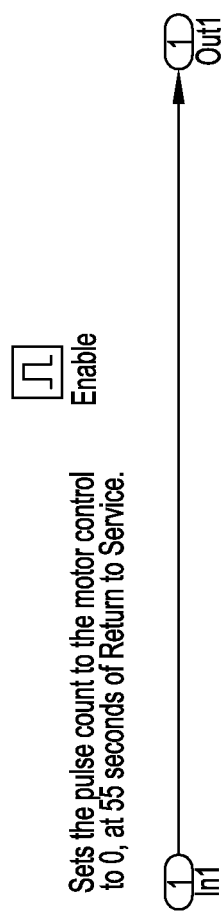
FIG. 21 shows the position zero (0) correction of the invention.

Input4 (FIG. 11), labeled 'hold', comes from the RTS block, FIG. 5. After the RTS function has returned the real motor position to the stop, a signal is sent to the 'hold' input, to zero the measured position (the measured position and real position would now be the same). This signal is held for 1 second. The SS_Mot_Zero_Corr block, FIG. 21, Sum6 and Sum9 perform this function. Out1 of the SS_Mot_Zero_Corr block tracks the measured motor position (pc) when the enable input is 1. It holds the last value when the enable signal goes to 0. This negative value (negative input at Sum9) is summed with pc at Sum5, providing 0 for the measured motor position. The 'hold' signal also goes to Sum4 where it removes the position connection during and after RTS, until the next power on-off cycle.

With reference now to FIG. 5, an appreciation of the Return to Service process can be obtained. If the velocity is less than 10 fps (5.9 knots) and the aircraft is on the ground, a Return to Service command will initiate a process which will provide an absolute motor position where the value of cpc will be the real motor position. This action will also zero or null the output signals from the force transducers. The pedal signal is disabled during Return to Service.

Figure 19:
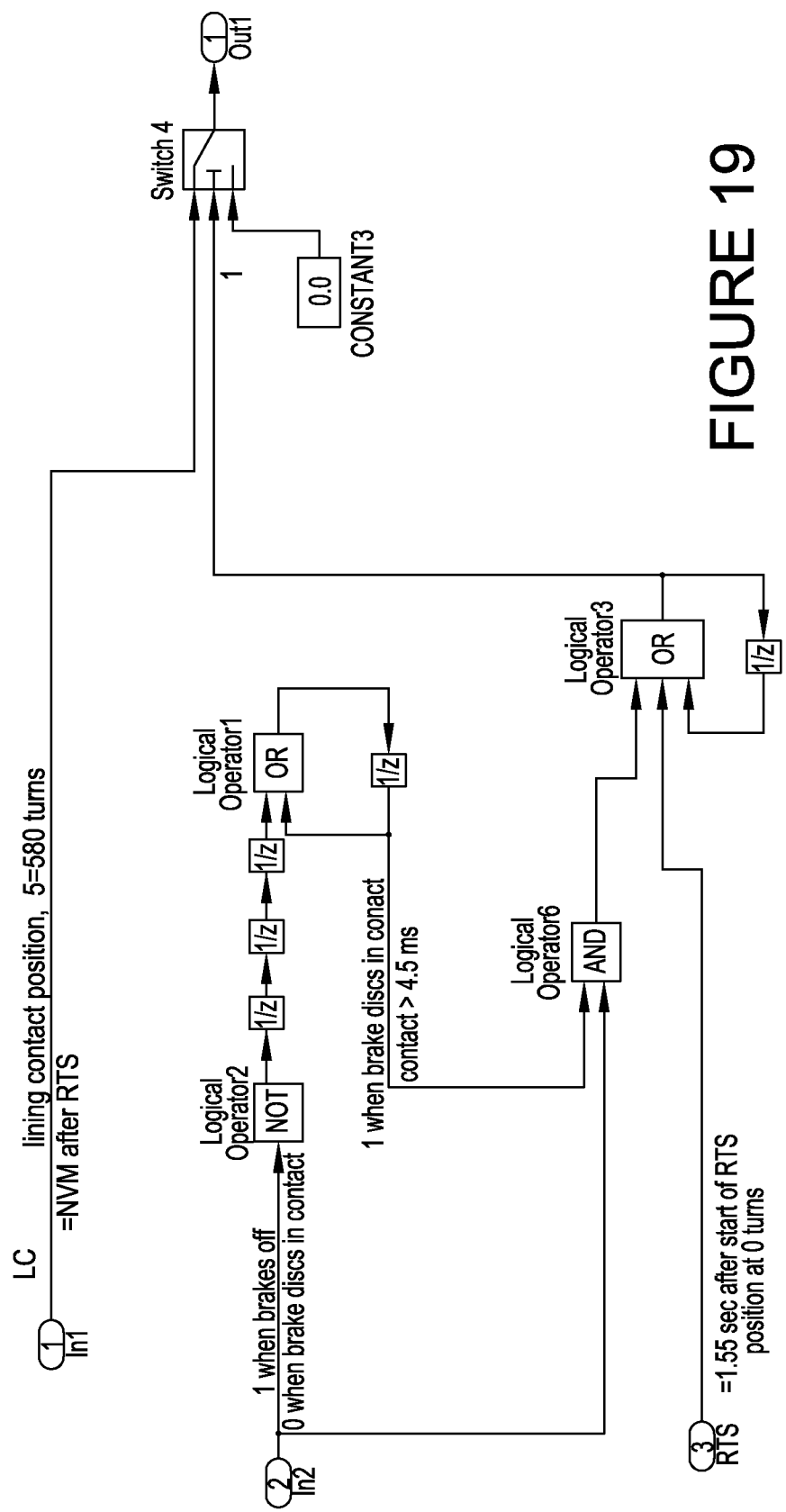
FIG. 19 shows a means for controlling the passing of the brake lining contact position to the non-volatile memory during the Return to Service.
Figure 23:
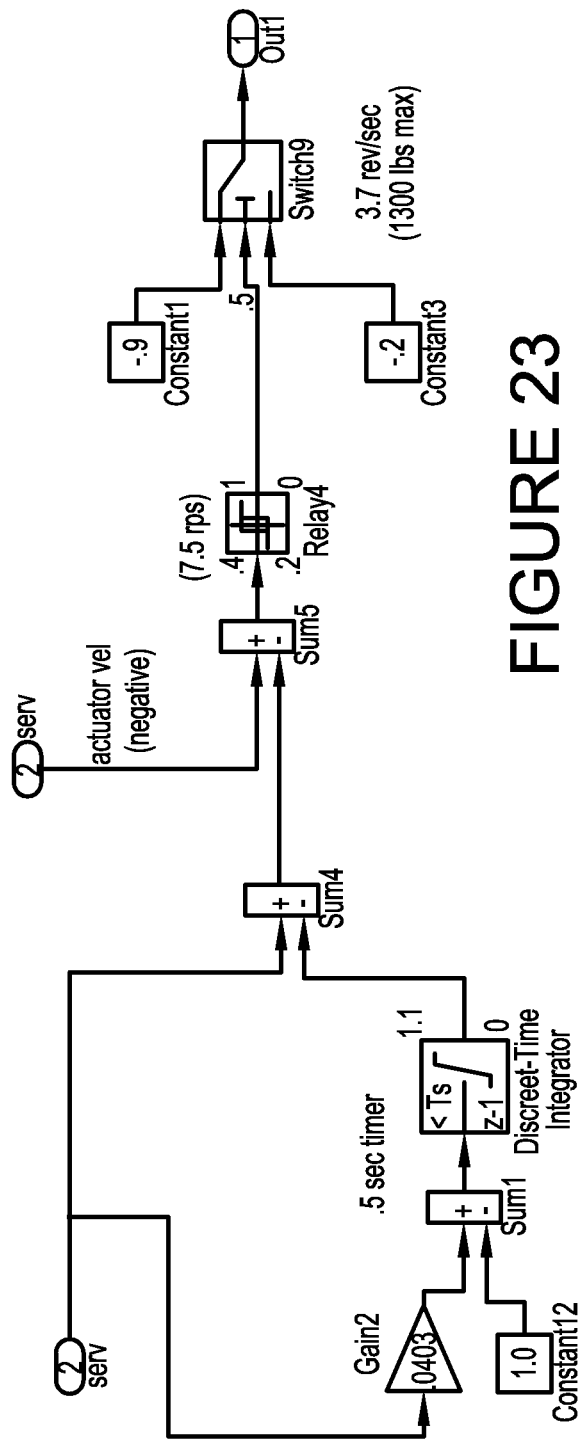
FIG. 23 shows the actuator speed control function that is used in the Return to Service.

To enable the system, a pedal or pedals is/are pressed above 7%, or the Park Brake is applied. At the Return to Service command, the Park Brake Lock will be removed (if used) and a signal of value 1 will be sent to the EMAC causing the following actions to occur:
1. The Force and Position Monitors are disabled.
2. The position non-volatile memories (NVM) will be set to 0.149 which is 17.3 turns above absolute 0 (return stop).
3. The force offset balance non-volatile memories will be set to 0.00.
4. The velocity command to the motors is set to −0.9 (17 rev/sec) for 55 seconds, which will cause the motors to back off to the absolute 0 position (velocity feedback will limit the return speed to between 16 and 18 rev/sec). At 55 seconds, the power off/on corrections to motor turns position (cpc) are set to 0 (Switch1, FIG. 11) until the next power off/on cycle. The motor position reading is corrected to read 0 by the SS_Mot_Zero Correct block (FIG. 21) on the Position Adjustment diagram (FIG. 11).
5. At 56 seconds, the −0.9 velocity command is set to 0.
6. At 56 seconds, a 20% braking command is provided (closed loop pedal signal), which will cause the position to increase above the lining disc contact of the brake.
7. At 56.5 seconds, set the braking command to 0. Also, at 56.5 seconds, any offset values from the force transducers are read and subtracted from the force output signal to correct the zero reading. This is a temporary correction until step 9 puts in the permanent correction.
8. At 57.5 seconds, a 20% braking command is provided (closed loop pedal signal), which will cause the position to increase above lining contact of the brake.
9. Also at this time, the offset values from the force transducers (step 7) are received by their external non-volatile memories, sent back and subtracted from the output signals to correct the zero force reading (refer to the SS_Zero_Adj_Filter block FIG. 8 (on FIG. 2).
10. At 65 seconds, the lining contact positions are read and passed on to their respective non-volatile memories, through the SS_NVM_Pass block, FIG. 19.
11. At 67 seconds, the 20% pedal signal is set to 0. The Return to Service action is complete. The value of cp is now 0. The Actuator Speed block is shown in FIG. 23.

Input4 (FIG. 11) labeled "hold" comes from the RTS block. After the RTS function has returned the real motor position to the stop, a signal is sent to the "hold" input to zero the measured position (the measured position and the real position would now be the same). This signal is held for 1 second. The SS_Mot_Zero_Corr block (FIG. 21), Sum5, Sum6 and Sum9 perform this function. Out1 of the SS_Mot_Zero_Corr block tracks the measured motor position (pc) when the enable input is 1. It holds the last value when the enable signal goes to 0. This negative value (negative input at Sum9) is summed with pc at Sum5, providing 0 for the measured motor position. The "hold" signal also goes to Switch1 where it removes the position correction during the RTS, until after the next power off-on cycle.

Thus, it can be seen that the various aspects of the invention have been satisfied by the structure and techniques presented above. While in accordance with the patent statutes only an exemplary embodiment of the invention has been presented and described in detail, the invention is not limited thereto or thereby. For an appreciation of the scope and breadth of the invention, reference should be made to the following claims.

What is claimed is:

1. A method for effecting force and position control of motor-driven electrical brake actuators for a brake disc stack having a characteristic built-in clearance, comprising employing a combination of actuator force feedback and actuator motor turns position feedback for controlling the force developed by the electrical brake actuators to obtain a motor turns position that achieves the characteristic built-in clearance, and wherein position feedback controls an initial actuation of the motor-driven electrical brake actuators for up to about 10% of actuator movement, with force feedback controlling after lining contact of the discs of the brake disc stack.

2. The method for effecting force and position control of motor-driven electrical brake actuators as recited in claim 1, further comprising a step of removing any offset value in a force transducer used for measuring the force that is developed by the electrical brake actuators.

3. The method for effecting force and position control of motor-driven electrical brake actuators as recited in claim 2, further comprising a step of preventing said motor-driven electrical brake actuators from returning to a motor turns position more than a set amount beyond said characteristic built-in clearance.

4. The method for effecting force and position control of motor-driven electrical brake actuators as recited in claim 1, further comprising a step of compensating the measured motor turns position of the actuators by a set number of turns correlated with parking brake force when power is turned on when a park brake has been engaged during a period prior to power off.

5. The method for effecting force and position control of motor-driven electrical brake actuators as recited in claim 1, further comprising a return to service step that periodically determines the actuator motor turns position for disc lining contact and stores that position in a non-volatile memory that maintains that position through a series of electric power off-on cycles.

6. The method for effecting force and position control of motor-driven electrical brake actuators as recited in claim 1, further comprising a step of modifying a measured actuator motor turns position to an actual actuator motor turns position when said actual actuator motor turns position is between a brake disc lining contact position and a position associated with said characteristic built-in clearance at a time of electric power turn-off.

7. The method for effecting force and position control of motor-driven electrical brake actuators as recited in claim 6, further comprising a step of modifying a measured actuator motor turns position to an actual actuator motor turns position when said actual actuator motor turns position is at or above a brake disc lining contact position at electric power turn-off.

8. The method for effecting force and position control of motor-driven electrical brake actuators as recited in claim 7, further comprising a step of modifying a measured actuator motor turns position to an actual actuator motor turns position upon a change of braking mode from an alternate braking mode to a normal braking mode.

9. The method for effecting force and position control of motor-driven electrical brake actuators as recited in claim 1, further comprising a step of periodically resetting the actuator motor turns position to maintain the characteristic built-in clearance as the brake discs of the brake disc stack wear.

10. The method for effecting force and position control of motor-driven electrical brake actuators as recited in claim 9, further comprising a step of stopping a motor turns position from returning beyond a design clearance position of the brake.

* * * * *